United States Patent
Horiguchi et al.

(10) Patent No.: US 7,601,656 B2
(45) Date of Patent: Oct. 13, 2009

(54) LEATHER-LIKE SHEET AND PROCESS FOR PRODUCING THEREOF

(75) Inventors: Tomoyuki Horiguchi, Otsu (JP); Katsuhiko Mochizuki, Mishima (JP); Akira Karasawa, Osaka (JP)

(73) Assignee: Toray Industries, Inc. (JP)

( * ) Notice: Subject to any disclaimer, the term of this patent is extended or adjusted under 35 U.S.C. 154(b) by 346 days.

(21) Appl. No.: 10/588,018

(22) PCT Filed: Feb. 10, 2005

(86) PCT No.: PCT/JP2005/002521

§ 371 (c)(1),
(2), (4) Date: Aug. 1, 2006

(87) PCT Pub. No.: WO2005/078184

PCT Pub. Date: Aug. 25, 2005

(65) Prior Publication Data
US 2007/0166509 A1 Jul. 19, 2007

(30) Foreign Application Priority Data
Feb. 13, 2004 (JP) .............................. 2004-036259

(51) Int. Cl.
*B32B 5/26* (2006.01)
*B32B 5/06* (2006.01)
(52) U.S. Cl. ....................... 442/268; 442/270; 442/276; 442/319; 442/199; 442/200; 442/201; 442/311; 428/91; 428/904
(58) Field of Classification Search ................ 442/268, 442/270, 276, 319, 199, 200, 201, 311; 428/91, 428/904
See application file for complete search history.

(56) References Cited

U.S. PATENT DOCUMENTS

| 4,146,663 | A | * | 3/1979 | Ikeda et al. | .................... 428/96 |
| 4,476,186 | A | * | 10/1984 | Kato et al. | .................... 442/60 |
| 2005/0118394 | A1 | * | 6/2005 | Tanaka et al. | ............... 428/151 |

FOREIGN PATENT DOCUMENTS

| JP | 54-116417 | | 9/1979 |
| JP | 3-280302 | B2 | 12/1991 |
| JP | 4-308271 | A | 10/1992 |
| JP | 5-45714 | B2 | 7/1993 |
| JP | 5-295634 | A | 11/1993 |
| JP | 5-339863 | A | 12/1993 |
| JP | 6-39747 | A | 2/1994 |
| JP | 11-269751 | A | 10/1999 |
| JP | 2001-96658 | * | 4/2001 |

* cited by examiner

Primary Examiner—Norca L Torres-Velazquez
(74) Attorney, Agent, or Firm—DLA Piper LLP (US)

(57) ABSTRACT

A leather-like sheet excellent in stretchability which is obtained by integrating by entanglement of a woven or knitted fabric and an ultrafine fiber of 0.0001 to 0.5 dtex, wherein at least one face of the leather-like sheet is substantially composed of said ultrafine fibers, and said woven or knitted fabric consists of a conjugate fiber in which two or more kinds of polyester-based polymers, at least one of which consists essentially of polytrimethylene terephthalate, are stuck along the fiber length direction side-by-side, or a conjugate fiber in which two or more kinds of polyester-based polymers, at least one of which consists essentially of polytrimethylene terephthalate, forms an eccentric sheath-core type conjugate structure, and the fiber constituting the woven or knitted fabric has a twist coefficient of 20000 or below.

27 Claims, 6 Drawing Sheets

LEATHER-LIKE SHEET AND PROCESS FOR PRODUCING THEREOF

TECHNICAL FIELD

The present invention relates to a leather-like sheet with extremely fine stretch, which is also excellent in wear feeling and formability.

BACKGROUND ART

Leather-like sheets such as artificial leathers exhibit softness and functionalities that are not of natural leathers, so that leather-like sheets are used for various applications such as clothing, materials.

Recently, the leather-like sheet excellent in stretch has been considered necessary particularly in use for clothing for the viewpoint of wear feeling and in use for materials for its formability.

There is a method (e.g. Patent Literature 1) for obtaining a stretchable artificial leather, in which: for example, a latent shrinkage woven fabric is formed by using a latent crimpable fiber yarn such as a false-twisted yarn or conjugate fiber made of two or more kinds of polymers with different heat-shrinkage properties as a latent shrinkage fiber; the latent shrinkage woven fabric is laminated by entanglement of ultrafine fibers; and a polymeric elastomer is applied thereto. With this method, elongation of the artificial leather depends largely on elongation of the stretchable woven fabric.

The latent crimpable fiber used as the latent shrinkage fiber means a fiber that becomes crimped by a heat treatment or a fiber that exhibits fine crimpability even before receiving the heat treatment, which is distinguished from a normal false-twisted yarn.

Specific examples may be a side-by-side type conjugate yarn made of polyethylene terephthalate (abbreviated as PET hereinafter) having difference of intrinsic viscosities or difference of limiting viscosities (e.g. Patent Literatures 2, 3), and a side-by-side type conjugate fiber made of homo-PET and copolymer PET of a more highly shrinkable (e.g. Patent Literature 4).

It is true that such latent crimpable polyester fiber yarn can exhibit stretch to a certain extent.

However, the stretch is still insufficient when it is formed into a woven fabric and when the woven fabric is laminated further into a leather-like sheet.

It is because the side-by-side type conjugate fiber described above has low crimpability when restricted within a woven fabric or because the crimp thereof is easily weaken by an external force. Unlike polyurethane fabric that utilizes stretch due to elongation of the fiber itself, the side-by-side type conjugate fiber utilizes elongation of three-dimensional coils generated by a difference of shrinkage ratios between the composite polymers. Therefore, under the restricted condition within a woven fabric or nonwoven fabric where the shrinkage of the polymer is limited, for example, it is considered that the fiber is thermally fixed with insufficient crimpability, thereby losing the higher shrinkability. This causes the above-described inconvenience.

In the meantime, there has been proposed artificial leather excellent in stretch, which is formed by entangling a woven or knitted fabric made of polytrimethylene terephthalate fiber with an ultrafine staple fiber (e.g. Patent Literature 5).

According to the information and knowledge of the inventors of the present invention, it has been found that a woven or knitted fabric made of the polytrimethylene terephthalate fiber alone is almost no elongation exhibited when made into a fabric, because the initial tensile resistance degree of the fiber made of the polytrimethylene terephthalate only is extremely high.

Patent Literature 1: Japanese examined patent application publication No. HEI 06-39747

Patent Literature 2: Japanese examined patent application publication No.SHO 44-2504

Patent Literature 3: Japanese published unexamined patent application No. HEI 04-308271

Patent Literature 4: Japanese published unexamined patent application No. HEI 05-295634

Patent Literature 5: Japanese registered patent No. 3280302

DISCLOSURE OF INVENTION

The object of the present invention is to improve the crimpability when restricted within the woven or knitted fabric in a leather-like sheet having a structure obtained by integrating a nonwoven fabric with a woven or knitted fabric using latent crimpable fibers by entanglement, and to provide the leather-like sheet with excellent stretch and a process for producing thereof The present invention for overcoming the above-described problems has the following structures.

That is, the leather-like sheet of the present invention is comprising the integration of by entanglement of a woven or knitted fabric with an ultrafine fiber of 0.0001 to 0.5 dtex, wherein at least one face of the leather-like sheet is substantially composed of said ultrafine fibers, and said woven or knitted fabric consists of a conjugate fiber in which two or more kinds of polyester-based polymers, at least one of which consists essentially of polytrimethylene terephthalate , are stuck along the fiber length direction side-by-side, or an eccentric sheath-core type conjugated fiber in which two or more kinds of polyester-based polymers, at least one of which consists mainly of polytrimethylene terephthalate, forms an eccentric sheath-core type structure, and the fiber yarn constituting the woven or knitted fabric has a twist coefficient of 20000 or below.

$$\text{twist coefficient } K = T \times D^{0.5}$$

where, T: number of twists per meter of fiber yarn (times)

D: fineness of fiber yarn (dtex)

Further, a method for producing a leather-like sheet of the present invention is characterized in that it comprises the step of integrating by entanglement of ultrafine fibers of 0.0001 to 0.5 dtex and a woven or knitted fabric which consists of a conjugate fiber in which two or more kinds of polyester-based polymers are stuck along the fiber length direction side-by-side, or a conjugate fiber, having an eccentric sheath-core structure in which two or more kinds of polyester-based polymers are eccentrically conjugated, made of polyester in which at least one of two or more kinds of polyester-based polymers consists mainly of polytrimethylene terephthalate, and the step of applying a shrinking treatment thereafter.

Furthermore, another method for producing a leather-like sheet of the present invention is characterized in that it comprises the step of applying a shrinking treatment on a woven or knitted fabric which consists of a conjugate fiber in which two or more kinds of polyester-based polymers are stuck along the fiber length direction side-by-side, or a conjugate fiber having an eccentric sheath-core structure in which two or more kinds of polyester-based polymers are eccentrically conjugated, made of polyester in which at least one of two or more kinds of polyester-based polymers consists essentially of polytrimethylene terephthalate, and the step of integrating by entanglement of a nonwoven fabric consisting of ultrafine fibers of 0.0001 to 0.5 dtex and the woven or knitted fabric.

The above-described leather-like sheet of the present invention and the process for producing thereof can achieve the stretch that is not of the natural leather. For example, it can provide excellent wear feeling when used for clothing, and formability when as materials, particularly in three-dimensional formability.

BEST MODE FOR CARRYING OUT THE INVENTION

Figure 1:
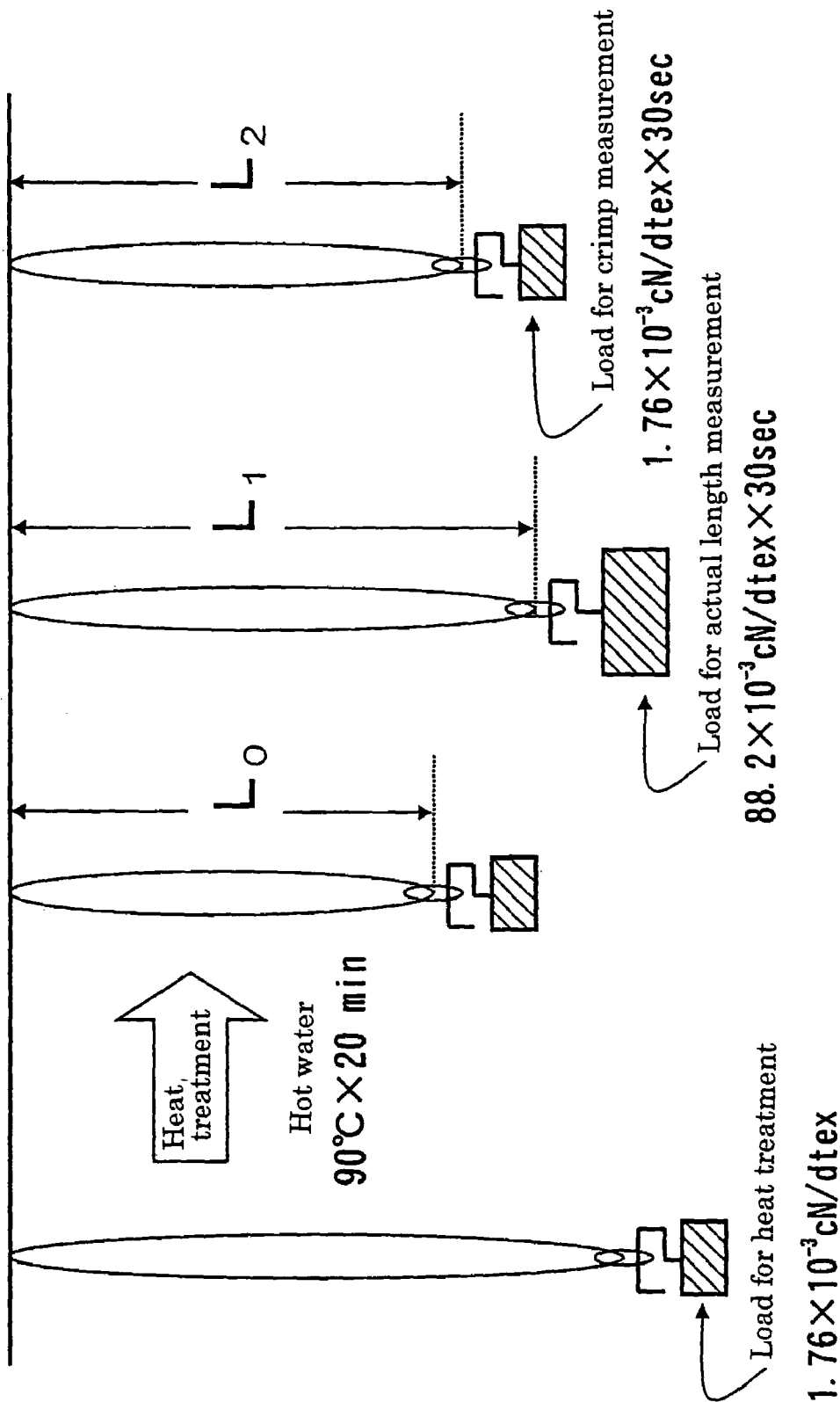
FIG. 1 is a diagram for illustrating a method for measuring the stretch elongation ratio and stretch modulus of elasticity.

The ultrafine fibers in the leather-like sheet of the present invention are constituted including those of single fiber fineness of 0.0001 to 0.5 dtex.

Single fiber fineness is preferably 0.001 to 0.3 dtex, and even more preferably 0.005 to 0.15 dtex. When it is below 0.0001 dtex, the strength deteriorates, hense undesirable. Furthermore, single fiber fineness above 0.5 dtex is also undesirable as it is too stiff hand results in an insufficient entanglement, which can cause issues such as deterioration of the surface quality.

Fibers of fineness not within the above-described range can also included as long as they are within a range that does not negatively affect the present invention.

There is no specific limit to the process for producing the so-called ultrafine fibers whose fiber fineness is within the above-described range. In addition to a regular filament spinning method, there may be used other process for producing it used for a non-woven fabric, such as spunbond, melt blow, electro-spinning, flash spinning method. Furthermore, as a means for producing the ultrafine fibers, there may be used a method for directly spinning the ultrafine fibers, in which a fiber of the normal fiber fineness capable of being used for generating the ultrafine fibers (hereinafter, referred to as a composite fiber convertible into a bundle of fine fibers) is spun, from which the ultrafine fibers are formed.

Specifically, as the methods for obtaining the ultrafine fibers using a composite fiber convertible into a bundle of fine fibers, a method of removing the sea component after spinning an sea-island type fiber or a method of spinning a splitable fiber and then splitting it into ultrafine pieces, etc. may be employed.

Among those measures, it is preferable for the present invention to produce the ultrafine fibers with a composite fiber convertible into a bundle of fine fibers, from which the ultrafine fiber can be easily and stably obtained. Furthermore, in the case of forming a leather-like sheet, it is more preferable to produce it with the sea-island type fiber, from which the ultrafine fibers made of the same kind of polymers that can be dyed with the same kind of dye can be easily obtained.

There is no specific limit to the method for obtaining the sea-island type fiber. For example, there are methods of (1) to (4) described below.

(1) A method of blending and spinning two or more components of polymer into a chip form.

(2) A method in which two or more components of polymer are kneaded and formed into chips in advance, and then spun.

(3) A method in which two or more components of polymer in a molten state are blended within a pack of a spinning machine by a static kneader and the like.

(4) A method using a spinneret disclosed in Japanese examined patent application publication No.SHO 44-18369, Japanese published unexamined patent application No. SHO 54-116417, etc.

In the present invention, all of the above methods allow for fine producing, however, the method (4) described above is the most preferable in that selection of the polymers is easy.

In this method (4), the cross-sectional shapes of the sea-island type fiber and the island fiber obtained by removing the sea component therefrom have no specific limit. Examples may be a circular-shape, polygonal-shape, Y-letter shape, H-letter shape, X-letter shape, W-letter shape, C-letter shape, π-letter shape, etc.

Furthermore, there is no specific limit in the number of types of polymers to be used. However, it is preferable to be within two to three components considering the spinning stability and dyeability. Particularly, it is preferable to be structured with a total of two components having one sea component and one island component. It is preferable for the component ratio of the island fiber to the sea-island type fiber in this case to be 0.3 to 0.99 in terms of weight ratio of the island fiber to the sea-island type fiber, more preferable to be 0.4 to 0.97, and even more preferable to be 0.5 to 0.8. If it is below 0.3, the removing ratio of the sea component increases, which is undesirable in terms of the cost. Also, if it exceeds 0.99, joining of the island components is easily generated, thus undesirable in terms of the spinning stability.

Moreover, there is no specific limit to the polymers to be used. For example, polyester, polyamide, polypropylene, polyethylene, etc. can all be used as appropriate for the island component. However, in terms of the dyeability and the strength, polyester and polyamide are preferable, and polyester being more preferable considering the dyeability with respect to a woven or knitted fabric that is used as the constituent element of the present invention.

There is no specific limit to the polyester as long as it is a polymer synthesized from both dicarboxylic acid or an ester-forming derivative thereof and diol or an ester-forming derivative thereof, which can be used as the composite fiber convertible into a bundle of fine fibers.

Specific examples may be polyethylene terephthalate (referred to as PET hereinafter), polytrimethylene terephthalate (referred to as PTT hereinafter), polybutylene terephthalate (referred to as PBT hereinafter), polycyclohexylene dimethylene terephthalate, polyethylene-2, 6-naphthalene dicarboxylate, polyethylene-1, 2-bis (2-chlorophenoxy) ethane-4, 4'-dicarboxylate, etc.

Among those, PET which is most generally used or a polyester copolymer mainly containing ethylene terephthalate unit is preferable for the present invention. Because the after-treatment processability is similar to that of the woven or knitted fabric used as the component of the present invention, PTT can be used more preferably.

As polyamide, for example, a polymer having amide bond such as nylon 6, nylon 66, nylon 610, or nylon 12 can be employed.

There is no limit to the polymer to be used as the sea component of the sea-island type fiber, as long as it has chemical characteristics such as solubility, degradability, which are different from those of the polymer for constituting the island component. Although it depends on the selection of the polymer for constituting the island component, there may be used polyolefin such as polyethylene, polystyrene, and polyester or the like obtained by copolymerization of 5-sodium sulfoisophthalic acid, polyethylene glycol, sodium dodecylbenzenesulfonate, bisphenol A compound, isophthalic acid, adipic acid, dodecadionic acid, cyclohexyl carboxylic acid, etc. Polystyrene is preferable in terms of the spinning stability, however, copolymer polyester having metal sulfonate group, such as 5-sodium sulfoisophthalic acid, is preferable in respect that it can be easily removed without using an organic solvent. For the copolymerization ratio, it is preferable to be 5 mol % or more in terms of the processing speed and stability, and more preferable to be 20 mol % or less for easily carrying out copolymerization, spinning and drawing. A particularly preferable combination in the present invention is a combination using either polyester or polyamide, or the both for the island component, and using polystyrene or a copolymer polyester having metal sulfonate group for the sea component.

For improving a concealability, inorganic particles such as titanium oxide particles or the like may be added into those polymers. In addition, a lubricant, pigment, heat stabilizer, ultraviolet light absorber, conductive agent, heat storage agent, antibacterial agent, etc. may be added in accordance with various purposes.

Further, there is no specific limit to the process for producing the sea-island type fiber. For example, it can be obtained by taking up undrawn yarn that has been spun by using the spinneret disclosed in the above-described method (4) at a normal spinning speed of 2500 m/min. or below, and then drawing it by one to three stages by either wet heat or dry heat, or the both.

Furthermore, there is no specific limit to the structure of the texture of the woven or knitted fabric that is an essential constituent of the leather-like sheet of the present invention.

In the present invention, a woven or knitted fabric is a general term for both a woven fabric and a knitted fabric. There are plain weave, twilled weave, satin weave, etc., for example, for the woven fabric. However, the plain weave is preferable in terms of the cost. Further, there may be circular knitting, tricot, raschel, etc. for the knitted fabric, and there is no specific limit set therebetween. Furthermore, when used for clothing and it is necessary to improve drapeability, the knitted fabric is more preferable than the woven fabric.

Such woven or knitted fabric consists of a conjugate fiber in which two kinds of polyester polymers, at least one of which made essentially of PTT, are stuck side by side along the fiber length direction, or of an eccentric sheath-core type conjugate fiber. It is preferable for all the woven or knitted fabrics used in the present invention to be the woven or knitted fabrics composed of such conjugate fiber. However, other fibers may be contained within a range that does not negatively affect the present invention.

For example, it is possible to apply stretch in the transverse direction or the longitudinal direction by using the conjugate fiber only for the weft or the warp.

It is preferable for the conjugate fibers to be those produced as the latent crimpable conjugate fibers. As an example of the method for producing the latent crimpable conjugate fiber, there is a method in which polymers of different viscosities are stuck and spun/drawn, and there generates different internal distortions between the two components by concentrating the stress to the higher viscosity side at the time of drawing. These internal distortions take a form of three-dimensional coil crimp due to a distortion generated within a single fiber, because the high viscosity side largely shrinks due to a difference of the elastic recovery ratios after being drawn and a difference of the heat shrinkage ratios at the time of heat treatment process of the fabric. The diameter of the three-dimensional coil and the number of the coils per unit fiber length depend on a shrinkage difference (including the difference of the elastic recovery ratios) between a high-shrinkage component and a low-shrinkage component. The larger the shrinkage difference, the smaller the coil diameter and the more the number of the coils per unit fiber length.

The smaller coil diameter is, and the larger the number of the coils per unit fiber length is, the more preferable for this coil, because the appearance is good. Further, it is preferable, since the better a fatigue durability of the coil is, the smaller the amount of the fatigue in accordance with the stretched time is, and the better an excellent stretch retainability is obtained. Furthermore, it is preferable as the woven or knitted fabric, since the smaller a hysteresis loss at the time of the elongation recovery of the coil is, the better an excellent resilience is obtained, and the finer fit sense is attained.

In order to satisfy the coil property, the property of the above-described high-shrinkage component (high-viscosity component) is important. For the stretch property of the coil, the stretch property of the high-shrinkage component having the low-shrinkage component as a fulcrum is dominant. Thus, high elongation property and recoverability are required for the polymer used for the high-shrinkage component.

The inventors have found in particular to utilize polyester mainly containing PTT for the high-shrinkage component, as a result of eager investigation carried out for satisfying the above-described property without losing the property of the polyester.

The PTT fiber exhibits extremely fine elongation recoverability, while keeping the dynamic property and chemical property equivalent to those of the PET fiber and PBT fiber as the typical polyester fibers. In the PTT crystal structure, methylene chain of an alkylene glycol part is in a gauche-gauche structure (the molecular chain is bent by 90°), and the density of restraint point by the mutual effect (stacking, parallel) of benzene rings is low, which provides a high flexibility. It is considered the molecular chain is easily elongated and recovered due to rotation of the methylene group because of these reasons.

Furthermore, there is no specific limit for the low-shrinkage component (low-viscosity component) of the conjugate fiber, as long as it is fiber-forming polyester with a stable yarn-producing property, which exhibits stable interface adhesiveness with respect to PTT as the high-shrinkage component. However, considering the dynamic property, chemical property, and the cost for the materials, PTT, PET, or PBT, which have fiber-forming property, are preferable.

It is preferable to use PTT for both the high-shrinkage component (high-viscosity component) and the low-shrinkage component (low-viscosity component), in respect that it can provide a large shrinkage difference by concentrating the stress more on the high-viscosity component in a spinning process through controlling the melting point and the glass transition temperature to the same level. The use of PTT for both components decreases Young's modulus, which provides an advantage of obtaining a softer crimped yarn with an excellent resilience.

For achieving the good yarn-producing property and low cost, it is preferable to use PET for the low-shrinkage component (low-viscosity component) and PTT for the high-shrinkage component (high-viscosity component). The combination of those can be selectively determined as appropriate in accordance with the required properties for that occasion.

The viscosity in the present invention means the intrinsic viscosity (IV), which is a value measured by a method as described below where a sample is dissolved in orthochlorophenol and measured at 25° C.

The conjugate fiber in the present invention is provided with the stretch because, as described above, rotation of methylene group occurs easily within the molecular chain of PTT and the molecular chain is stretched. This change is reversible, and it has been found by various experiments conducted by the inventors that the higher the degree of crystallization, the higher the crimp recoverability and the crimp retainability. Thus, it is better for the degree of the crystallization to be as high as possible, and it is preferable to be 35% or more and more preferable to be 40% or more. For the degree of the crystallization, the density was measured according to JIS L1013 (1999) (chemical fiber filament yarn testing method) 8.17.2 density gradient tube method, and the degree of the crystallization was obtained from a following expression (it is noted that values of dc, da were of PTT, and the degree of crystallization was for the case when PTT was used for both components).

$$Xc (\%) = \{dc \times (d-da)\} / \{d \times (dc-da)\} \times 100$$

where, Xc: degree of crystallization (%)
d: observed density of yarns
dc: density of perfect crystal part
da: density of perfect noncrystal part
1.387 g/cm³ was used as dc and 1.295 g/cm³ was used as da herein.

For the conjugation ratio of both components, it is preferable to be within the range of 75:25 to 35:65 (wt %)=high-shrinkage component:low-shrinkage component, and more preferable to be within the range of 65:35 to 45:55 in terms of the yarn-producing property and the dimensional homogeneity of the coil in the fiber length direction.

PTT in the present invention is polyester that is obtained having terephthalic acid as the main acid component and 1,3-propanediol as the main glycol component. There may be contained, however, another copolymer component capable of forming ester bond by a proportion of 20 mol % or less, more preferably 10 mol % or less. Although not limited, examples of the compounds capable of copolymerization are: dicarboxylic acids such as isophthalic acid, succinic acid, cyclohexane dicarboxylic acid, adipic acid, dimer acid, sebacic acid, 5-sodium sulfoisophtalic acid; and diols such as ethylene glycol, diethylene glycol, butanediol, neopentyl glycol, cyclohexane dimethanol, polyethylene glycol, polypropylene glycol. Further, titanium dioxide as a matting agent, fine particles of silica and alumina as a lubricant, hindered phenol derivative as an antioxidant agent, and a coloring pigment or the like may be added as necessary.

Furthermore, the conjugate fiber as the constituent element of the present invention is preferable to be an eccentric sheath-core type in the case of high-speed spinning that requires a high spinning stability, and preferable to be a side-by-side type in the case where still higher crimp property is required. Furthermore, regarding the fiber cross section of the side-by-side type, it is preferable for the composite interface between the two components to be linear because the crimpability becomes high and the stretch is improved.

Figure 2:
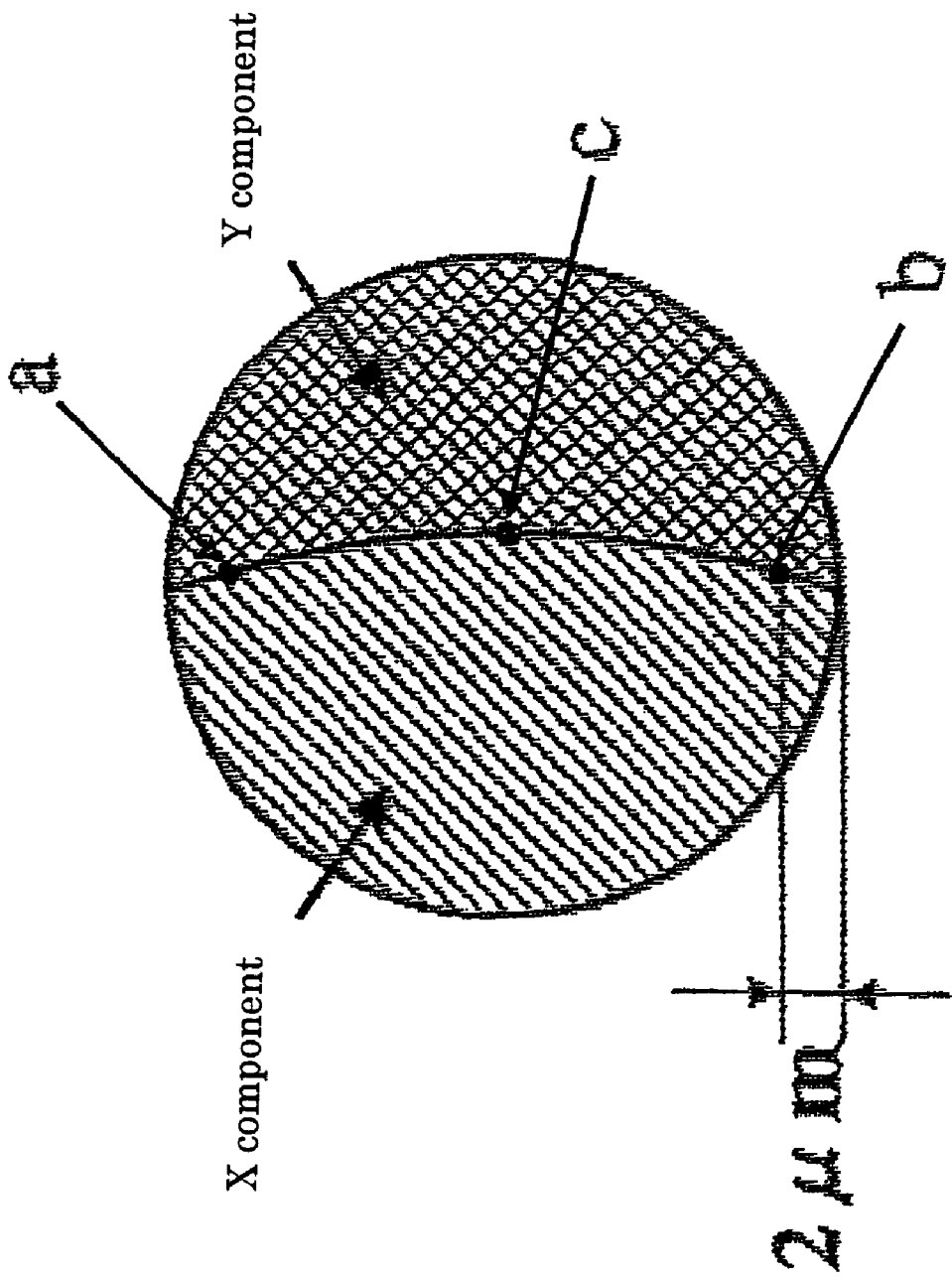
FIG. 2 is a model diagram for illustrating the curvature radius R of a composite interface in a cross section of a fiber that can be used for producing the leather-like sheet of the present invention.

In the composite interface of the fiber cross sections shown in FIG. 2, there is obtained the curvature radius R (μm) of a circle that is tangential to three points, i.e. a, b points at a depth of 2 μm from the fiber surface towards the center and c point at the center of the interface. As an indicator for showing the linearity of the composite interface, it is preferable for R to be $10d^{0.5}$ or more where d indicates the fineness of the single fiber (dtex). More preferably, the curvature radius R is $15d^{0.5}$ or more. In all of FIG. 3(a) to (g), the curvature radius R is $10d^{0.5}$ or more, showing the fiber cross sections used preferably for the present invention.

Further, the fiber cross sectional shape of the conjugate fiber is not specifically limited and may be a circular cross section, triangular cross section, multilobal cross section, flattend cross section, X-shaped cross section, and other various modified cross sections. However, considering the balance between the crimpability and hand, a semicircular side-by-side having the circular cross section as shown in FIG. 3(a) to (d), a hollow side-by-side as shown in FIG. 3(e) aiming to achieve lightening the weight, heat-retention, and resilient feeling, a side-by-side with a triangular cross section as shown in FIG. 3(h) and the like aiming to achieve dry hand are used preferably.

Among those, like cocoon-shaped as in FIG. 3(f) and a key-shaped as in FIG. 3(g), a flat shape having the composite interface in the minor-axis direction of the cross section is preferable. Further, it is more preferable to set the flatness degree expressed by a ratio of major axis to minor axis of the cross section as 1.5 to 6. Furthermore, it is even more preferable to be asymmetrical on the left and right sides with respect to the composite interface (FIG. 3(g)). With such specific cross sectional shape, the crimp phases of the single fibers that constitute the multifilament can be effectively shifted between the single fibers and separated each other. Therefore, it is possible to obtain a leather-like sheet with a fine surface quality while improving the stretch.

Further, for another form of yarn for effectively shifting the phases between the single fibers, a false-twisted crimped yarn or a crimped yarn without false-twisting is also effective. The reason is that the phases between the filaments can be effectively shifted since it is possible to provide crimps with a cycle different from that of the spiral crimp that is resulted from the side-by-side type conjugate structure through having the multifilament yarn made of crimpable polyester-based conjugate fiber described above as the false-twisted crimped yarn or the crimped yarn without false-twisting. A method for providing the false-twisted crimped yarn or a method for providing the crimped yarn without false-twisting is not specifically limited, and any methods such as false-twisting using a widely-used false twister, stuffing type crimping, knit-deknit crimping may be employed.

The above-described specific cross-sectional shape and the false-twisted crimped yarn or the crimped yarn without false-twisting provide a bulky yarn form, so that it is possible to obtain a leather-like sheet with an excellent elasticity together with a high stretch.

Further, it is preferable for the crimpable polyester-based conjugate fiber yarn to have the twist number T of 0 to 3000 times (turns)/m so that it provides an excellent stretch when formed into a leather-like sheet. It is more preferable to be 0 to 1000 turns/m and even more preferable to be 0 to 500 turns/m. If below 3000 turns/m, a fine stretch can be obtained when formed into a leather-like sheet.

In general, when the crimpable polyester conjugate fiber yarn is used without a twist for a woven fabric, shrinkage due to crimp becomes too large and the surface of the woven fabric tends to be roughened. Thus, when used for the woven fabric, the high crimpable polyester-based conjugate fiber yarn is preferable to be middle-twisted yarn or high-twisted yarn having a twist coefficient K of 7000 or more. In the present invention, however, it is integrated with ultrafine fibers by entanglement and the ultrafine fibers are on the surface practically. Thus, such issue is insignificant. For integrating it with the ultrafine fibers by entanglement, it is necessary for the twist coefficient K to be 20000 or less since there is no stretch generated if the twist coefficient K is large. It is preferable to be 7000 or less, more preferable to be 4000 or less, and even more preferable to be 2000 or less. There is no specific limit set for the lower limit of the twist coefficient K, and it can be controlled as necessary considering the entanglement property with respect to the ultrafine fibers.

twist coefficient $K = T \times D^{0.5}$ where, T: the number of twists (times) per one meter of fiber yarn length, and D: the fineness (dtex) of the fiber yarn. The number of twists T per one meter of the yarn length is a value obtained through performing untwist by an electric twist tester under a load of $90 \times 10^{-3}$ cN/dtex, and the number of untwists when completely untwisted is divided by the untwisted yarn length.

A method for producing such conjugate fiber is not specifically limited. For example, it may be obtained by: providing polyester (X) mainly having PTT for one of the two kinds of polyester-based polymers and polyester (Y) having the fiber forming property for the other, which are joined together by a spinneret shown in FIG. 4, for example, at an upper part of a discharge hole for forming side-by-side composite flow; and discharging it from the discharge hole that is for obtaining a desired cross sectional shape. The conjugated fiber may be produced by a two-step method in which the discharged yarn, after cooled and coagulated, is wound-up once and then drawn or drawn/false-twisted. Alternatively, it may be produced through a direct spinning and drawing method in which the yarn is directly drawn after spinning and take-up.

In order to produce such conjugate fiber stably, the intrinsic viscosities of each component and a difference between the intrinsic viscosities of each component are critical. Even though it is a conjugate fiber, it is not practical if the viscosity of one of the components is too low, thus exhibiting no fiber forming property or, inversely, the viscosity is too high and there requires a special spinning device. Furthermore, an extent of bending (bending phenomenon) of the yarn right below the discharge hole depends on the viscosity difference between each of the components, which largely affects the yarn-producing property. Therefore, the intrinsic viscosities (IV) of each component are preferable to be in a combination that satisfies the following expressions.

$0.30X \leq Y \leq 0.45X + 0.30$ $0.45 \leq Y$ $0.8 \leq X \leq 2.0$ where, Y: intrinsic viscosity (IV) of fiber-forming polyester
X: intrinsic viscosity (IV) of polytrimethylene terephthalates When carrying out multicomponent spinning, it is preferable for the intrinsic viscosity (IV) of the fiber-forming polyester Y to be 0.45 or more, with which the stable yarn-producing property can be obtained. It is more preferable to be 0.50 or more. In order to achieve still higher crimp property, it is preferable for the intrinsic viscosity of the fiber-forming polyester Y to be 0.7 or less, and more preferable to be 0.65 or less. Meanwhile, in order to perform stable melt extrusion of the PTTX, it is preferable for the intrinsic viscosity to be within the range of 0.8 to 2.0, and more preferable to be 1.1 to 1.7.

Furthermore, as the combination of the intrinsic viscosities of the two components, it is preferable for the value of Y to be larger than Y=0.30X, so that the excessive bending of the spun yarn towards the high-viscosity component side can be suppressed and yarn-producing can be performed stably for a long time. Meanwhile, it is preferable to make the value of Y smaller than Y=0.45X+0.30 so that the crimp property of the obtained yarn can be brought up to a target level.

Further, it is preferable for the spinning temperature to be at 250 to 270° C. for the case where the fiber-forming polyester Y is PTT or PBT, and 270 to 285° C. for the case of PET.

Furthermore, it is preferable for the high crimpable polyester-based conjugate fiber used for the present invention to have a temperature at which the shrinkage stress indicates the maximum is 110° C. or higher and 200° C. or lower, and the maximum value of the shrinkage stress of 0.15 to 0.50 cN/dtex. For that, it is preferable to set the spinning speed at 2000 m/min. or less, more preferable to be 1500 m/min. or less, and perform drawing by high magnifications while having it slid on an abrasion material in a drawing area such that the breaking elongation becomes 35% or less. The drawing tension can be increased due to a frictional resistance by the abrasive body, so that the shrinkage stress is increased because of the increase in the internal distortion. Preferable as the abrasive body to be used are a pin, hot plate, rotational roller and the like whose abrasive-body surfaces are satin-finished. Further, in order to make the temperature indicating the maximum of the shrinkage stress be at 110° C. or higher, the temperatures of the abrasive body or a heat-setting device may be set at 110° C. or higher. Considering the drawability and the easiness of handling at the high-order process, the heat-setting temperature is preferable to be within the range of 110° C. to 200° C. Furthermore, it is preferable for the drawing temperature to be at 40 to 80° C. for the case where the fiber-forming polyester is PTT or PBT, and at 55 to 95° C. for the case of PET. For making it to a false-twisted yarn, there may be carried out false-twisting after going through the above-described drawing operation. Alternatively, a highly oriented undrawn yarn is formed at a spinning speed of 2000 to 5000 m/min., and there may be carried out out-draw false-twisting (false-twisting after drawing) using an abrasive body or in-draw false-twisting (false-twisting while drawing) in which the yarn is fretted on a hot plate. The higher the heat-setting temperature in this state, the better the obtained stretch. It is preferable to be 110 to 210° C., more preferable to be 130 to 200° C., and even more preferable to be 150 to 190° C.

The leather-like sheet of the present invention is obtained by integrating of the above-described ultrafine fiber and woven or knitted fabric by entanglement, with which the stretch of the woven or knitted fabric can be well utilized.

In general, such leather-like sheet has conventionally been obtained by impregnating an appropriate amount of polymeric elastomer. In the present invention, however, in order to generate a fine stretch in particular, the amount of the polymeric elastomer such as polyurethane, if impregnated, is preferable to be below 5 wt %. It is more preferable to be below 3 wt %, and even more preferable to be below 1 wt %. Furthermore, it is most preferable to contain substantially no polymeric elastomer.

That is, it is most preferable to be composed substantially of a fiber material and contains substantially no polymeric elastomer. It is not preferable to contain a large amount of polymeric elastomer, since the adhesiveness between the fibers increases, thereby deteriorating the stretch. "Composed substantially of a fiber material" means that it is composed only of the fiber material out of the constituents of a typical leather-like sheet, i.e. the fiber material and the polymeric elastomer. However, the leather-like sheet of the present invention may contain other processing agents used in the latter processing, e.g. dye, softening agent, abrasion resistance improver, various fastnessimprover, antistatic agent, or fine particles.

In general, when the conventional leather-like sheet contains no polymeric elastomer or contains the content of 5 wt % or less, the ultrafine fibers are easily separated from the woven or knitted fabric. Thus, it is difficult to obtain a leather-like sheet with a sufficient physical property for practical use.

In the present invention, the used amount (content) of the polymeric elastomer is determined preferably as 0 to 5 wt % for generating a finer stretch. With a method for producing the leather-like sheet according to the present invention to be described later, both characteristics such as the sufficient physical property and fine stretch, which contradict with each other conventionally, can be satisfied.

There is no specific limit for the polymeric elastomer to be used in the present invention, and examples are polyurethane, acryl, or styrene-butadiene, etc., which have been conventionally used for the leather-like sheet. Among those, it is preferable to use polyurethane in terms of the softness, strength, quality, etc. There is no specific limit in the method for producing polyurethane, and it can be produced by a conventionally known method in which polymer polyol, diisocyanate, and a chain extender are reacted as appropriate. A solvent type or water-dispersed type may be used, however, the water-dispersion type is preferable regarding the work environment.

In an abrasion resistance test of the leather-like sheet of the present invention conducted in accordance with a load for furniture (12 kPa) of JIS L 1096 (1999) 8. 17. 5 E-method (Martindale method), it is preferable for an abrasion loss of a sample cloth after 20000-time abrasions to be 20 mg or less. It is more preferable to be 15 mg or less and even more preferable to be 10 mg or less. Moreover, it is preferable for the pills to be five or less, more preferable to be three or less, and the most preferable to be one or less. It is not preferable for the abrasion loss to exceed 20 mg, since a fluff is likely to attach to clothing or the like in an actual use. Meanwhile, there is no specific limit for the lower limit, and it is possible with the leather-like sheet of the present invention to achieve extremely small abrasion loss. Furthermore, it is not preferable to have more than five pills, since the quality deteriorates due to a change on the appearance when used.

The leather-like sheet having such abrasion resistance can be obtained by the producing method of the present invention. Particularly, the fiber apparent density is important, and the better the abrasion resistance becomes, the higher the density becomes. Furthermore, use of a large amount of softening agent and the like tends to induce deterioration. Therefore, it is necessary to set those conditions while minding the balance between hand.

The leather-like sheet of the present invention is obtained by integrating of the above-described ultrafine fiber and woven or knitted fabric by entanglement, and the entanglement state thereof is not specifically limited. An example may be a state where the woven or knitted fabric and the ultrafine fiber are entangled with each other three-dimensionally. As the ultrafine fibers, there may be contained a bundle of ultrafine fibers. However, for improving the peel strength with respect to the woven or knitted fabric, the most preferable state is that the ultrafine fibers are dispersed into each fiber to such an extent that the bundle-state of the ultrafine fibers are hardly observed.

Further, the ultrafine fiber is not specifically limited, and a filament or a staple fiber may be used. However, the staple fiber is preferable since the stretch and the surface quality thereof are superior.

The fiber length of the staple fiber is not specifically limited. However, it is preferable to be within the range of 0.1 mm to 100 mm, more preferable to be within the range of 10 mm to 100 mm, and even more preferable to be within the range of 20 mm to 70 mm. It is not preferable for the fiber length to be below 1 mm with which the abrasion resistance deteriorates, and not preferable to exceed 100 mm with which the stretch and the surface quality tend to deteriorate. Further, it is also preferable to mix the ultrafine fibers of 1 mm to 10 mm into the ultrafine fibers of 10 mm to 100 mm for improving the surface quality.

The woven or knitted fabric may be positioned at the center of the cross section in the thickness direction of the leather-like sheet, or may be unevenly distributed on one side. Furthermore, one of the surfaces may substantially be the woven or knitted fabric. However, it is necessary to form at least one of the surfaces substantially with the ultrafine fibers in order to obtain an excellent surface quality, soft touch, writing effect and the like.

Particularly, when used for clothing and the like, a fine quality is required for both the top and back surfaces in many cases. In that case, it is preferable for both surfaces to be formed substantially with the ultrafine fibers.

"At least one of the surfaces is formed substantially with the ultrafine fibers" herein means that there is substantially no polymeric elastomer observed when the surface is observed by an SEM, microscope, or the like.

Furthermore, as the leather-like sheet, the surface thereof can be made grained type or plush type by raising finishing. However, the plush type with the surface being raised is more preferable since it can make the effects of the present invention still better.

In the present invention, at least the above-described nonwoven fabric and the woven or knitted fabric may be laminated. Furthermore, other nonwoven fabric and woven or knitted fabric may be laminated further. For example, it may be in a structure of three layers or more, such as a layer structure of the nonwoven fabric, woven or knitted fabric, and nonwoven fabric, a layer structure of the nonwoven fabric, nonwoven fabric, and woven or knitted fabric, a layer structure of nonwoven fabric, or knitted woven fabric, nonwoven fabric, and woven or knitted fabric, nonwoven fabric, etc.

Furthermore, particularly in the case where there are a product face and a back face and the quality is required for the back face as well, it is preferable for both top and back faces to be nonwoven fabric. For example, it is preferable to be made of a three-layer structure having the nonwoven fabric as the top face, the woven or knitted fabric as the middle layer, and the nonwoven fabric as the back face.

In the present invention, it is preferable for the weight ratio of the woven or knitted fabric to be 5 to 50 wt %, and more preferable to be 10 to 40 wt %. If below 5 wt %, the stretch of the woven or knitted fabric is hard to be reflected upon the leather-like sheet sufficiently. Furthermore, if it exceeds 50 wt %, the hand becomes like that of a woven or knitted fabric, which makes it difficult to provide a sense of high quality as the leather-like sheet.

When laminating the nonwoven fabric for the back face, it is preferable to use the one produced by a paper making method, with which reduction in the weight per unit area is easy, so that the appearance quality can be improved without increasing the entire weight per unit area unnecessarily. However, in general, it is hard for the surface made of the nonwoven fabric produced by a paper making method to have a high abrasion resistance. Therefore, when used particularly for the case requiring high abrasion resistance, it is preferable to be a nonwoven fabric containing staple fibers in which mainly the ultrafine fibers with the fiber length of 1 cm to 10 cm are entangled.

Further, the leather-like sheet of the present invention is characterized as having an excellent stretch. At least in one direction, the elongation ratio defined by JIS 1096 (1999) 8. 14. 1 A-method is preferable to be 10 to 50%, more preferable to be 15 to 40%, and even more preferable to be 20 to 35%.

Similarly, in at least one direction, it is preferable for the elongation recovery ratio defined by JIS L 1096 (1999) 8. 14. 2 A-method to be 75 to 100%. It is more preferable to be 80 to 100% and even more preferable to be 85 to 100%. It is not preferable for the elongation ratio to be below 10%, with which the stretch becomes little insufficient and there is a stiff feeling when used for clothing. In the meantime, it is not preferable for the elongation ratio to exceed 50%, with which the elongation recovery ratio becomes lower. Furthermore, it is not preferable for the elongation recovery ratio to be below 75%, with which there is generated distortion when used, thereby causing deformation.

When used for clothing in particular, a balance of the elongation ratio between the longitudinal direction and transverse direction is important. The elongation ratio in the longitudinal direction is preferable to be 5 to 30%, more preferable to be 7 to 25%, and even more preferable to be 10 to 20%. Furthermore the elongation ratio in the transverse direction is preferable to be 10 to 50%, more preferable to be 15 to 40%, and even more preferable to be 20 to 35%.

Moreover, it is preferable for the elongation ratio in the transverse direction to be larger than that of the longitudinal direction. It is not preferable for the elongation ratio in the longitudinal direction to be below 5%, with which a fine silhouette is hard to be expressed. In the meantime, it is not preferable to be over 30%, with which the drapeability becomes deteriorated.

Further, it is not preferable for the elongation ratio in the transverse direction to be below 10%, with which the stretch becomes to some extent insufficient and there is generated a stiff feeling, and it is not preferable for the elongation ratio in the transverse direction to exceed 50%, with which the elongation recovery ratio becomes lower.

It is preferable to have a larger elongation ratio in the transverse direction than that of the longitudinal direction because it is possible to express a fine silhouette when used for clothing in particular. Furthermore, it is preferable for the elongation recovery ratio in both the longitudinal and transverse directions to be 75 to 100%. It is more preferable to be 80 to 100% and even more preferable to be 85 to 100%. It is not preferable for the elongation recovery ratio to be below 75%, with which there is generated distortion when used, thereby causing deformation.

In the present invention, the forming direction of the nonwoven fabric is taken as the longitudinal direction and the width direction of the nonwoven fabric as the transverse direction. The forming direction of the nonwoven fabric can be judged in general from a plurality of factors, e.g. the orientation direction of the fibers, streaks and processing marks left behind due to needle punching, high-speed fluid treatment, or the like. When it is impossible to estimate or determine the definite longitudinal direction because the judgment based on the plurality of factors contradict with each other, no definite orientation or no streaks remained, etc., the direction with which the tensile strength becomes the maximum is determined as the longitudinal direction and the direction orthogonal thereto is determined as the transverse direction.

In the present invention, further, it is preferable for the leather-like sheet to contain fine particles, from which the abrasion resistance becomes excellent. It is particularly preferable in the case of a structure where the ultrafine fibers of the fiber material are entangled with each other, since the presence of the fine particles provide a large effect on improving the abrasion resistance.

The fine particles may be contained within the fiber, however, a better effect can be obtained at least when the particles are contained outside the fiber.

The material for the fine particles herein is not specifically limited as long as it is insoluble in water. For example, inorganic materials such as silica, titanium oxide, aluminum, mica or organic materials such as melamine resin can be used. Further, the average diameter of the fine particles is preferable to be 0.001 to 30 μm, more preferable to be 0.01 to 20 μm, and even more preferable to be 0.05 to 10 μm. It is not preferable to be below 0.001 μm, which makes it hard to achieve the prescribed effect that can be obtained by using the fine particle in the present invention. Meanwhile, it is not preferable to exceed 30 μm, with which a washing durability is deteriorated due to a fall from the fibers. The average diameter can be measured by a measuring method appropriate for the material and size, e.g. BET method, laser method, or Coulter method.

The use amount of these fine particles can be controlled as appropriate within the range with which the effect of the present invention can be achieved. However, it is preferable to be 0.01 to 10 wt %, more preferable to be 0.02 to 5 wt %, and even more preferable to be 0.05 to 1 wt %. With the amount of 0.01 wt % or more, a notable effect of enhancing the abrasion resistance can be achieved. As the amount increases, the effect tends to become larger. However, it is not preferable to exceed 10 wt %, with which the hand becomes stiffened. In order to prevent the fall of fine particles and improve durability, it is preferable to use a little amount of resin as well.

Furthermore, in order to achieve a soft hand and smooth surface touch, it is preferable for the leather-like sheet of the present invention to contain a softening agent.

There is no specific limit set for the softening agent, and those used generally for a woven or knitted fabric can be selected as appropriate in accordance with the type of fabric.

For example, those recorded under names of hand processing agent or softening finishing agent in "DYEING NOTE, 23$^{rd}$ Edition" (issued on Aug. 31, 2002, published by SHIKISENSHA Co., LTD.) can be selected as appropriate. Among those, silicone-based emulsion is preferable since it exhibits an excellent softening effect, and amino-modified silicone emulsion or epoxy-modified silicone emulsion is more preferable. With a content of these softening agents, the abrasion resistance tends to deteriorate. Thus, it is preferable to control the amount of the softening agent and that of the above-described fine particles by balancing between the target hand and the abrasion resistance. Therefore, the amount is not specifically limited, however, it is preferable to be within the range of 0.01 to 10 wt % since the effect can not be achieved when the amount is too small, and there generates a sense of stickiness when it is too large.

Next, there will be described an example of the method for producing the leather-like sheet of the present invention.

First, the ultrafine fibers of 0.0001 to 0.5 dtex and a woven or knitted fabric are integrated by entanglement. The woven or knitted fabric consists composed of a conjugate fiber in which two or more kinds of polyester-based polymers are stuck along the fiber length direction side by side, or a conjugate fiber in which two or more kinds polyester-based polymers having an eccentric sheath-core type conjugate structure, at least of which consists essentially of polytrimethylene terephthalate.

When formed into the woven or knitted fabric or when it is further entangled with the ultrafine fibers to be in a restricted condition, the shrinkage stress is a critical property for generating the coil crimp by overcoming the restricting force. The higher the shrinkage stress, the better the crimpability under the restriction. In order to improve the crimpability at a shrink step such as a heat treatment, the temperature at which the maximum shrinkage stress exhibits is preferable to be at 110 to 200° C. The maximum value of the shrinkage stress is preferable to be 0.15 to 0.50 cN/dtex, more preferable to be 0.25 to 0.50 cN/dtex, and even more preferable to be 0.30 to 0.50 cN/dtex.

Further, for the latent crimpable conjugate fiber used in the present invention, it is preferable to use the one having the stretch elongation ratio of 30 to 250% after a heat treatment. As depicted in Japanese published unexamined patent application No.HEI 06-322661, conventionally, a heat treatment is applied on a latent crimpable polyester-based fiber under a state with almost free of load, and the crimp property in that state is defined. However, this does not necessarily reflect the crimp property under the restricted state.

Therefore, the inventors of the present invention have paid attention to the fact that the crimpability under restriction is important. The inventors carried out a heat treatment under a load by a method shown in FIG. 1 and defined the elongation ratio and elongation elastic modulus shown by expressions below according to JIS L1013 (chemical fiber filament yarn testing method (1999) 8.11 section, C-method (simple method).

stretch elongation ratio (%)=$[(L_1-L_0)/L_0] \times 100$ stretch modulus of elasticity (%)=$[(L_1-L_2)/(L_1-L_0)] \times 100$ That is, it is considered that the crimpability under restriction can be expressed as the fiber hank stretch elongation raio, through applying a heat treatment while hanging the load same as $1.8 \times 10^{-3}$ cN/dtex to the fiber hank as the restricting force.

It indicates that the higher the stretch elongation ratio, the higher the crimpability. With the ratio of 30 to 250%, a proper stretch can be provided. The higher the stretch elongation ratio, the more the stretch is improved when formed into a leather-like sheet. Thus, it is preferable to be 50% or more, and more preferable to be 80% or more.

Incidentally, a PET conjugate yarn having a difference of intrinsic viscosities as disclosed in Japanese examined patent application publication No. SHO 44-2504 or a conjugate yarn made of a combination of homo-PET and high-shrinking copolymer PET as disclosed in Japanese published unexamined patent application No. HEI 05-295634 has the stretch elongation ratio of about 5% at the most.

Further, when the stretch is provided by elongation of the coil crimp, the durability of the crimp is also one of the important factors. Thus, the elongation modulus of elasticity can be a reference as an indicator. It is preferable for the elongation modulus of elasticity to be higher as much as possible. In order to maintain the wear durability and fit sense, it is preferable to be 85 to 100%, and more preferable to be 90% or more. The PET-based conjugate yarn having a difference of intrinsic viscosities as disclosed in Japanese examined patent application publication No. SHO 44-2504 has a crimp retention ratio of about 80% at the most. Further, in the conjugate yarn made of a combination of homo-PET and high-shrinking copolymer PET as disclosed in Japanese published unexamined patent application No. HEI 05-295634, it is merely about 70%.

For the leather-like sheet of the present invention, the method for integrating the ultrafine fiber and the woven or knitted fabric by entanglement is not specifically limited. For example, there may be employed: a paper-making method in which a paper-making slurry of ultrafine fiber is introduced to a woven or knitted fabric; a method in which the ultrafine fibers are generated after integrating a composite fiber convertible into a bundle of fine fibers and a woven or knitted fabric by entanglement; and a method in which a nonwoven fabric of the ultrafine fibers is produced and a woven or knitted fabric is integrated therewith by entanglement, etc. However, the preferable method is the one in which the nonwoven fabric of the ultrafine fibers is produced once and then it is integrated with the woven or knitted fabric by entanglement, with which the high-quality surface can be obtained. At that time, the woven or knitted fabric may be arranged on one side or within the nonwoven fabric, which is not specifically limited. The weight per unit area of the nonwoven fabric of the ultrafine fibers is preferable to be 10 to 350 g/m$^2$, more preferable to be 20 to 250 g/m$^2$, and even more preferable to be 50 to 150 g/m$^2$. It is not preferable for the weight per unit area to be below 10 g/m$^2$, with which the woven or knitted fabric is likely to be exposed to the surface of the leather-like sheet, thereby deteriorating the surface quality. Furthermore, it is not preferable to exceed 350 g/m$^2$, with which the stretch becomes deteriorated.

As the nonwoven fabric of the ultrafine fibers, it is preferable to be nonwoven fabric containing the ultrafine staple fibers, with which the surface quality becomes excellent. A wet method or dry method may be used for obtaining it, however, the dry method is preferable because there is less fiber fall generated with friction.

As a preferable dry method for producing, there may be a method in which the staple fiber nonwoven fabric is produced by needle punching treatment using composite fiber convertible into a bundle of fine fibers of 1 to 10 dtex, which is capable of generating ultrafine fibers, and then it is made into ultrafine fibers for obtaining the nonwoven fabric of the ultrafine fibers. By needle punching treatment, such staple fiber nonwoven fabric is provided with an apparent density of 0.12 to 0.3 g/cm$^3$ preferably. It is more preferable to be 0.15 to 0.25 g/cm$^3$. When it is below 0.12 g/cm$^3$, the entanglement is insufficient and it becomes difficult to obtain the target physical property. Further, there is no specific limit set for the upper limit, however, it is not preferable to exceed 0.3 g/cm$^3$, with which there may cause issues, e.g. the needle may be broken, pin hole may remain, etc.

When carrying out needle punching treatment, it is preferable for the fineness of the single fiber to be 1 to 10 dtex, more preferable to be 2 to 8 dtex, and even more preferable to be 2 to 6 dtex. When the single fiber fineness is below 1 dtex or over 10 dtex, entanglement by needle punching treatment becomes insufficient. Thus, it becomes difficult to obtain the nonwoven fabric containing the ultrafine staple fibers with a fine physical property.

It is preferable for needle punching treatment in the present invention to serve not just as tentative fastening for going through the steps but also as enabling sufficient entanglement by prevent cut of the fibers.

Therefore, it is preferable to have a punching density of 100 punching needles/cm$^2$ or more, more preferable to be 500 punching needles/cm$^2$ or more, and even more preferable to be 1000 punching needles/cm$^2$ or more.

The staple fiber nonwoven fabric of the composite fiber convertible into a bundle of fine fibers obtained in this manner is preferable to be shrunk by dry heat, wet heat, or the both to be made into having still higher density, so that the surface appearance and the form stability become excellent.

It is preferable to carry out high-speed fluid treatment after the ultrafine fiber-making treatment or simultaneously with the ultrafine fiber-making treatment, or simultaneously with the ultrafine fiber-making treatment and thereafter as well, for entangling the ultrafine fibers with each other and entangling them with the woven or knitted fabric. The high-speed fluid treatment can also serve as the ultrafine fiber-making treatment. However, it is preferable to continue the high-speed fluid treatment at least even after the ultrafine fiber-making treatment is almost completed, in order to promote the entanglement of the ultrafine fibers still further. Furthermore, it is preferable to carry out the high-speed fluid treatment after the ultrafine fiber-making treatment.

The method for integration when integrating the nonwoven fabric and the woven or knitted fabric is not specifically limited. For example, it can be achieved by needle punching treatment, high-speed fluid treatment, etc.

In the present invention, it is preferable when integrating the composite fiber convertible into a bundle of fine fibers and the woven or knitted fabric by entanglement to employ needle punching treatment in order to achieve the entanglement integration more firmly. The high-speed fluid treatment is preferable when integrating the ultrafine fibers and the woven or knitted fabric by entanglement.

It is preferable in the present invention to employ the high-speed fluid treatment, particularly considering damages to the conjugate fiber by the needle and restriction on the physical property of the conjugate fiber for preventing the damages. However, the high-speed fluid treatment as a method for integrating the woven or knitted fabric and the ultrafine fiber by entanglement is preferable to be carried out before and/or after the ultrafine fiber-making treatment. In order to improve the entangling property still higher, it is preferable to perform integration by entanglement at least after carrying out the ultrafine fiber-making treatment.

The method for ultrafine fiber-making treatment is not specifically limited. For example, there are a mechanical method, chemical method, etc. The mechanical method is a method for carrying out ultrafine fiber-making treatment by supplying a physical stimulus. Examples may be a method of supplying a pressure between rollers, and a method of applying ultrasonic treatment, etc. in addition to the methods of supplying an impact such as the above-described needle punching treatment and water-jet punching treatment.

Further, an example of the chemical method may be a method which provides changes such as swelling, decomposing, dissolving by agents at least for one of the components constituting the composite fiber convertible into a bundle of fine fibers. Particularly, one of the preferable forms for the present invention is a method in which the staple finer nonwoven fabric is prepared by a composite fiber convertible into a bundle of fine fibers made by using an alkali-decomposable sea component, and ultrafine fiber-making treatment is carried out by a treatment using a neutral to alkali solution, since the work environment is preferable because there is no solvent used.

"A neutral to alkali solution" herein means a solution indicating pH6 to pH14, and the agent or the like to be used is not specifically limited. For example, it may be a solution containing organic or inorganic salts indicating pH within the above-described range. Examples are alkali metal salt such as sodium hydroxide, potassium hydroxide, lithium hydroxide, sodium carbonate, sodium hydrogencarbonate, and alkaline earth metal salt such as calcium hydroxide and magnesium hydroxide. Furthermore, as necessary, amines such as triethanolamine, diethanolamine and monoethanolamine, a weight-reducing promoting agent, carrier or the like can be used therewith. Particularly, sodium hydroxide is preferable in terms of the cost, easiness of handling, etc. Furthermore, it is preferable to apply a treatment with the above-described neutral to alkali solution on a sheet, and then dry it after, if necessary, neutralizing and washing it to eliminate the remaining agent, decomposed materials or the like.

The method of simultaneously carrying out the ultrafine fiber-making treatment and high-speed fluid treatment is preferable for cutting the cost by improving the efficiency. Examples thereof are: a method that uses a composite fiber convertible into a bundle of fine fibers consists of water-soluble sea component, in which water-jet punching treatment is carried out for elimination and entanglement; and a method that uses a composite fiber convertible into a bundle of fine fibers consists of two or more components having a different decomposing speed in alkali, in which the soluble component is decomposed through alkali treating liquid and then water-jet punching treatment is carried out for final elimination and entanglement processing.

For the high-speed fluid treatment, it is preferable to carry out water-jet punching treatment using a water current in terms of the work environment. At that time, it is preferable for the water current to be in a columnar stream state. Normally, the columnar stream can be obtained by jetting from a fluid jet nozzle of a diameter of 0.06 to 1.0 mm under a pressure of 1 to 60 MPa. In this treatment, the diameter of the nozzle (fluid jet nozzle) is preferable to be 0.06 to 0.15 mm and the interval to be 5 mm or less in order to achieve an effective entanglement property and fine surface quality. It is more preferable for the diameter to be 0.06 to 0.12 mm and the interval to be 1 mm or less. When carrying out the treatment for a plurality of times, it is not necessary for all of these specs of the nozzle to be in the same conditions. For example, nozzles with a large hole and a small hole can be used together. However, it is preferable to use the nozzle of the above-described structure at least once.

Further, in order to achieve a uniform entanglement in the thickness direction and/or to improve the smoothness of the surface of the nonwoven fabric, it is preferable to carry out the treatment for a number of times repeatedly. The water-stream pressure is determined as appropriate in accordance with the weight per unit area of the nonwoven fabric, and it is preferable to use a higher pressure for nonwoven fabric having higher value of the weight per unit area.

Furthermore in order to entangle the ultrafine fiber with each other to a higher degree, it is preferable to carry out the treatment under a pressure of 10 MPa or higher at least once, and more preferable to carry out the treatment under a pressure of 15 MPa or higher at least once. There is no specific limit for the upper limit, however, it is preferable to be 40 MPa or less and more preferable to be 30 MPa or less, since the cost increases, the nonwoven fabric becomes nonuniform when the weight per unit area is low, and a fluff may be generated due to cut of the fibers as the pressure increase.

With this, even in the case of using the composite fiber convertible into a bundle of fine fibers, for example, it is possible to obtain a nonwoven fabric containing the ultrafine staple fibers in which the ultrafine fibers are entangled with each other by a higher degree to such an extent that there is almost no entanglement of the ultrafine fiber bundles observed. This enables to improve the surface property such as the abrasion resistance. Before carrying out the water-jet punching treatment, there may be carried out a treatment for immersing it in water. For further improvement of the surface quality, it is also possible to carry out a method such as to move the nozzle head and the nonwoven fabric relatively, or carry out the water-dispersing treatment by inserting a wire net between the nonwoven fabric and the nozzle after the entanglement. Furthermore, when the woven or knitted fabric is exposed to the surface, the quality deteriorates. For preventing this, it is preferable to carry out the treatment under a pressure of 10 MPa or less, preferably under a low pressure of 5 MPa or less at first, and then under a pressure of 10 MPa or higher.

When there is no crimp generated in the fibers constituting the woven or knitted fabric in the nonwoven fabric structure that contains the woven or knitted fabric obtained in this manner, subsequently, there is carried out a shrinking treatment through a relaxing treatment or the like. Further, weight-reducing treatment by alkali can also be carried out as necessary.

Since the lamination is easy, it is a preferable method to carry out the shrinking treatment after integrating the ultrafine fiber and the woven or knitted fabric by entanglement, with which a finer stretch can be obtained. In the meantime, it is preferable to shrink the woven or knitted fabric and then integrate it with the nonwoven fabric by entanglement, since the surface quality becomes excellent and handling and management become easy. Particularly, a woven or knitted fabric before shrunk may shrink with time when stored for a long term, so that the latter method is preferable for this case. In both methods, a fine stretch can be achieved by shrinking it after the integration by entanglement or in the woven or knitted fabric state by at least 5 to 50% in the longitudinal direction or the transverse direction, or both in the longitudinal and transverse directions. It is more preferable to be shrunk by 10 to 40%, and still more preferable to be 15 to 35%.

Further, as described above, it is preferable for the present invention to contain no polymeric elastomer. However, it can be used by an appropriate content for controlling the hand or in accordance with the required physical property.

There is no specific limit for the polymeric elastomer. Examples may be polyurethane, acryl, styrene-butadien, etc. Among those, it is preferable to use polyurethane, considering the softness, strength, quality and the like.

Figure 6:
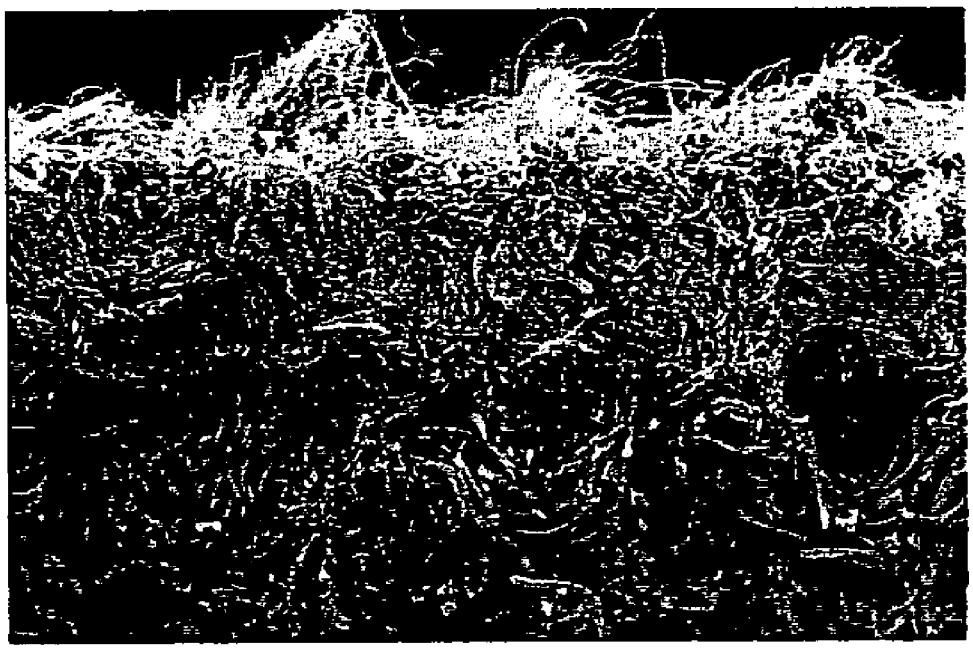
FIG. 6 is a cross sectional photograph showing an example of the leather-like sheet of the present invention.

FIG. 6 is a cross-sectional enlarged photograph, showing an example of the leather-like sheet according to the present invention. It is an SEM microphotograph showing an enlargement of a cross section taken along the thickness direction of the leather-like sheet of the present invention, which is constituted by integrating the woven or knitted fabric and the ultrafine fiber of 0.0001 to 0.5 dtex by entanglement.

There is no specific limit for the method of producing polyurethane, and it can be produced by a conventionally known method in which polymer polyol, diisocyanate, and a chain extender are reacted as appropriate.

As a method for applying those, it is possible to employ various methods, e.g. a method in which polyurethane solution dissolved in a solvent such as DMF, is impregnated into the sheet and then wet-coagulated, a method in which water-dispersible polyurethane is impregnated, and then coagulated by wet or dry method together with dispersion break, etc. The method of using the water-dispersing polyurethane is preferable in terms of the work environment, and the method of performing heat-sensitive coagulation is preferable for preventing migration when drying.

By compressing the thickness to 0.1 to 0.8 times through a calendar at the temperature of 100 to 250° C., the apparent density of the fiber can be increased further, which is preferable in respect that it provides an excellent surface quality, improved abrasion resistance, and minute hand. It is not preferable to compress it by less than 0.1 times since the hand becomes too stiff. It may be over 0.8 times, however, there tends to decrease the effect of compression. It is preferable to carry out the treatment at 100° C. or higher, with which the thickness becomes hard to be recovered and the effect of the compression can be better achieved. In the meantime, it is not preferable to be at 250° C. or less, since the stiffening of the hand by weld or the like can be suppressed. It is not preferable to perform compression before the high-speed fluid treatment, since the entanglement by the high-speed fluid treatment becomes hard to proceed.

Furthermore, in order to finish the raised surface, there may be employed various kinds of methods as appropriate, such as carrying out a buffing treatment by a sandpaper and the like. Further, in order to finish the surface in a grained surface, there may be employed various kinds of methods such as coating and/or laminating a polymeric elastomer, etc.

In the present invention, it is preferable to perform dyeing by a jet dyeing machine. The above-described compression treatment, buffing treatment and the like can be carried out before and/or after the dyeing.

Further, after the dyeing, there may be carried out various functional processing in addition to the softening treatment, e.g. water-repellent finishing, antibacterial treatment, pill resistance treatment, high color-developing treatment, etc.

The leather-like sheet of the present invention obtained in this manner has an excellent stretch, excellent formability, and an appearance with an excellent surface quality as well. Thus, it can be used for various purposes such as clothing, car sheets, general goods, materials, etc.

EXAMPLES

In the followings, the present invention will be described in detail by Referring to Examples. For measuring each of the physical property values in Examples, the following method was used.

Reference Examples 1 to 10 noted below describe conditions for manufacturing yarns and nonwoven fabrics used in each Example.

A. Intrinsic Viscosity IV 0.8 g of sample polymer was dissolved in 10 ml of ortho-chlorophenol (abbreviated as OCP hereinafter), and a relative viscosity $\eta r$ was obtained using an Ostwald viscometer at 25° C. from a following expression to calculate the intrinsic viscosity IV.

$$\eta r = \eta/\eta_0 = (t \times d)/(t_0 \times d_0)$$

intrinsic viscosity $IV = 0.0242 \eta r + 0.2634$ where, $\eta$: viscosity of polymer solutions
$\eta_0$: viscosity of OCP
t: fall time (sec) of solution
d: density (g/cm$^3$) of solution
$t_0$: fall time (sec) of OCP
$d_0$: density (g/cm$^3$) of OCP B. Shrinkage Stress It was measured by a thermal stress measuring instrument, a product of KANEBO ENGINEERING Co., LTD., at a temperature increasing speed of 150° C./min. A sample was made into a loop of a circumferential length of 10 cm, and the initial tension was set as fiber fineness (dtex)×0.9×(1/30) gf.

C. Stretch Elongation Ratio, Stretch Modulus of Elasticity

According to JIS L1013 (chemical fiber filament yarn testing method (1999)) 8.11 section C-method (simple method), a hot-water treatment was carried out at 90° C. for twenty minutes after carrying out a heat treatment under a load by a method shown in FIG. 1. Then, the stretch elongation ratio and the stretch modulus of elasticity of the yarn were defined by the following expressions.

stretch elongation ratio (%)=$[(L_1-L_0)/L_0] \times 100$ stretch modulus of elasticity (%)=$[(L_1-L_2)/(L_1-L_0)] \times 100$ where, $L_0$: a hank length (cm) measured after carrying out the hot-water treatment at 90° C. for twenty minutes while a load of $1.8 \times 10^{-3}$ cN/dtex was imposed to a fiber hank, and air-dried for a whole day and night.

$L_1$: a hank length (cm) that was measured after eliminating the load that was imposed for measuring $L_0$ upon completing the measurement of $L_0$ as described above, and then thirty seconds has passed from imposing a load of $90 \times 10^{-3}$ cN/dtex anew as a load for measuring actual length.

$L_2$: a hank length (cm) that was measured after eliminating the load imposed when measuring $L_1$ after completing the measurement of $L_1$ as described above and leaving it for two minutes, and thirty seconds has passed from imposing the load of 1.8×10-3 cN/dtex again as a load for measuring actual length.

D. Breaking Elongation of Raw Yarn

A yarn was measured by TENSILON UCT-100, a product of ORIENTEC Co., LTD., under a condition shown in JIS L1013 (chemical fiber filament yarn testing method).

E. Breaking Elongation After Boiling-water Treatment

After generating coil crimp by applying a boiling-water treatment to a yarn for fifteen minutes with almost no load, a tensile test was carried out by fixing a gripping length under a load of $1.8 \times 10^{-3}$ cN/dtex. It was pulled with 50 mm for a gripping interval and a tensile speed of 200 mm/min. A load-elongation curve was obtained thereby and breaking elongation was divided by the gripping interval for obtaining the elongation.

F. Crystallization Degree Xc

The density was measured according to a density-gradient tube method of JIS L1013 (chemical fiber filament yarn testing method (1999)) 8.17.2, and the crystallization degree Xc was obtained form the following expression.

$Xc$ (%)=$\{dc \times (d-da)\}/\{d \times (dc-da)\} \times 100$ where, Xc: crystallization degree (%)

d: observed density of yarn dc: density of perfect crystal part da: density of perfect noncrystal parts 1.387 g/cm$^3$ was used as dc and 1.295 g/cm$^3$ was used as da herein.

G. Melting Viscosity

Measurement was carried out three times using capillograph B1, a product of Toyo Seiki Seisaku-sho, Ltd., a distortion speed of 1216 sec$^{-1}$ at a temperature of 280° C. under nitrogen atmosphere, and the average value was taken as the melting viscosity.

H. Uster Unevenness

Unevenness of thickness in the yarn longitudinal direction (normal test) was measured by USTER TESTER MONITOR C, a product of Zellweger Uster. The yarn was supplied for one minute at a yarn travelling speed of 50 m/minute, and an average deviation ratio (U %) was measured with a normal mode.

I. Twist Coefficient K

The twist coefficient K of the yarn was obtained form the following expression.

twist coefficient $K=T \times D^{0.5}$ where, T: number of twist per one meter of fiber yarn length, D: fineness of fiber yarn(dtex)

The number of twist T per one meter of fiber yarn length is a value that is obtained when a fiber yarn is untwisted by an electric twist tester under a load of $90 \times 10^{-3}$ cN/dtex, and the number of untwist when completely untwisted is divided by the fiber yarn length after being untwisted.

J. Martindale Abrasion Test

In an abrasion resistance test measured in accordance with a load for furniture (12 kPa) of JIS L 1096 (1999) 8. 17. 5 E-method (Martindale method), four pieces of samples were prepared. Weight loss of the test pieces whose surfaces were worn for 20000 times was measured by a unit of 0.1 mg and the number of pills was counted from the external appearance, and the averages were taken as the values thereof.

K. Stretch

The elongation ratio of the sheet was measured (gripping interval is 20 cm) by JIS L 1096 (1999) 8. 14. 1 A-method (constant-speed elongation method).

Furthermore, the elongation ratio of the sheet was obtained (gripping interval is 20 cm) by JIS L 1096 (1999) 8. 14. 2 A-method (repeated constant-speed elongation method).

The obtained values were rounded off to the whole numbers to be inserted in the table.

The one of the elongation ratio of 10% or more in the transverse direction was considered as having "excellent stretch" and marked with "o", the one of the ratio of 5% or more and below 10% was considered as having "regular stretch" and marked with "Δ", and the one with the ratio of below 5% was considered as having "inferior stretch" and marked with "X". Each marking was inserted into the section of "evaluation" in Table 2.

Reference Example 1

Figure 3:
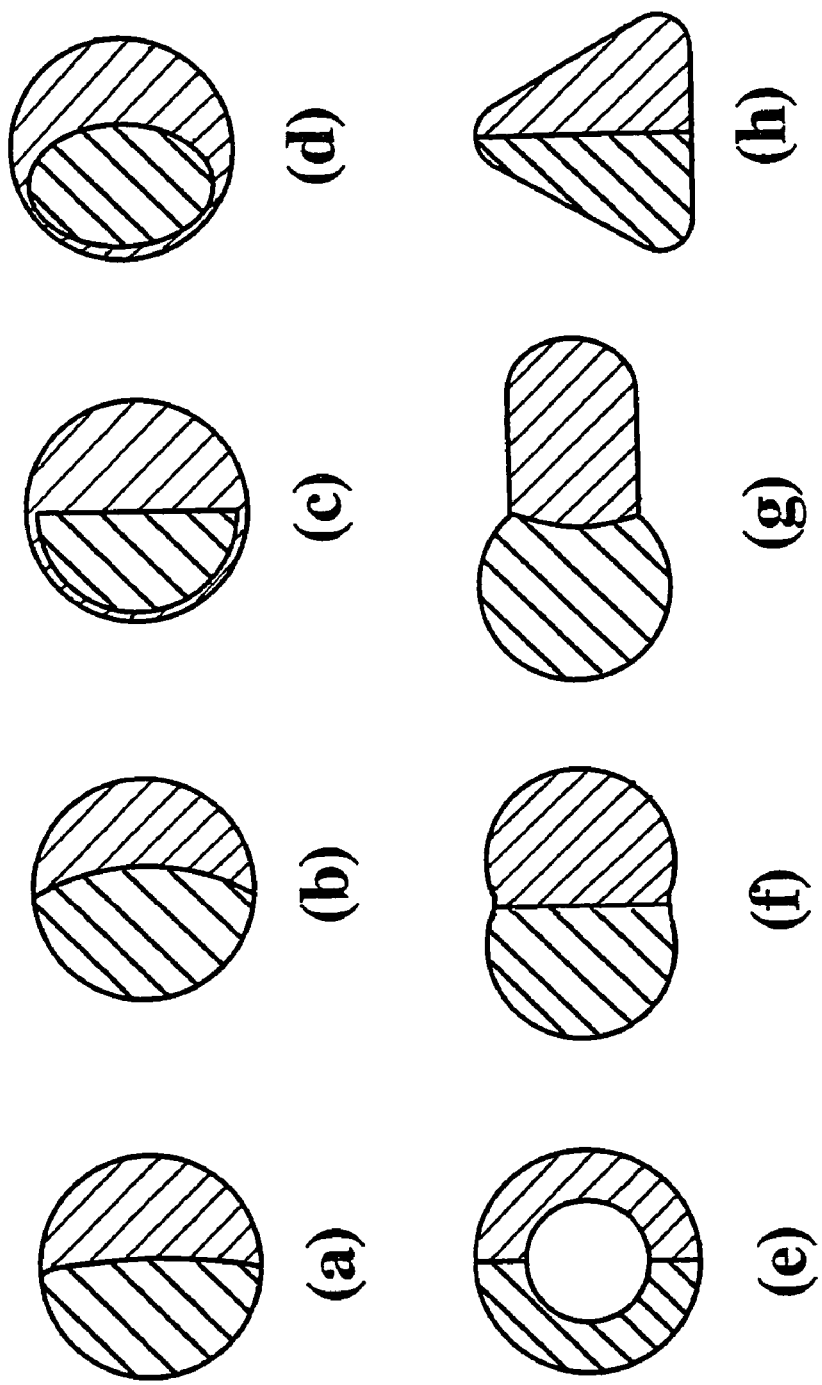
FIG. 3 is an diagram for showing cross-sectional shape of the fibers that can be used for producing the leather-like sheet of the present invention.
Figure 4:
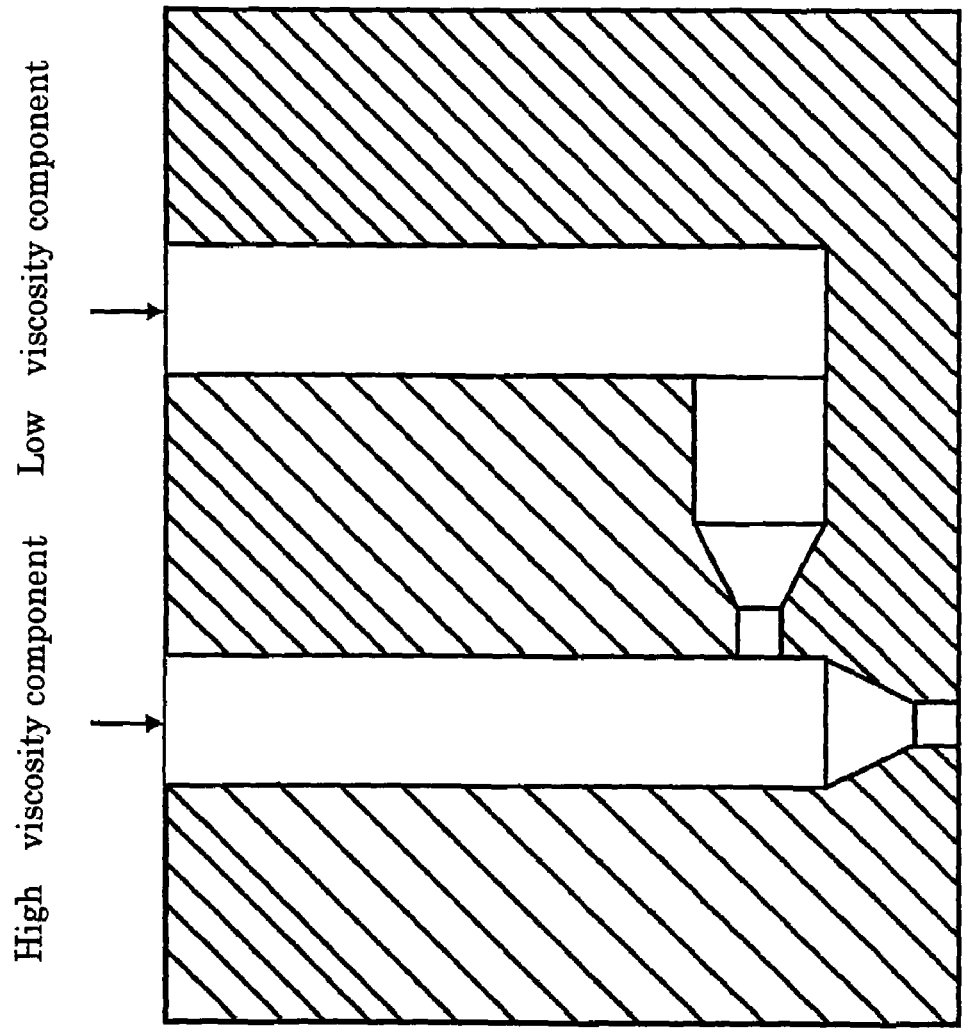
FIG. 4 is a longitudinal sectional view of a spinneret that can be preferably used for producing the fibers useable for producing the leather-like sheet of the present invention.
Figure 5:
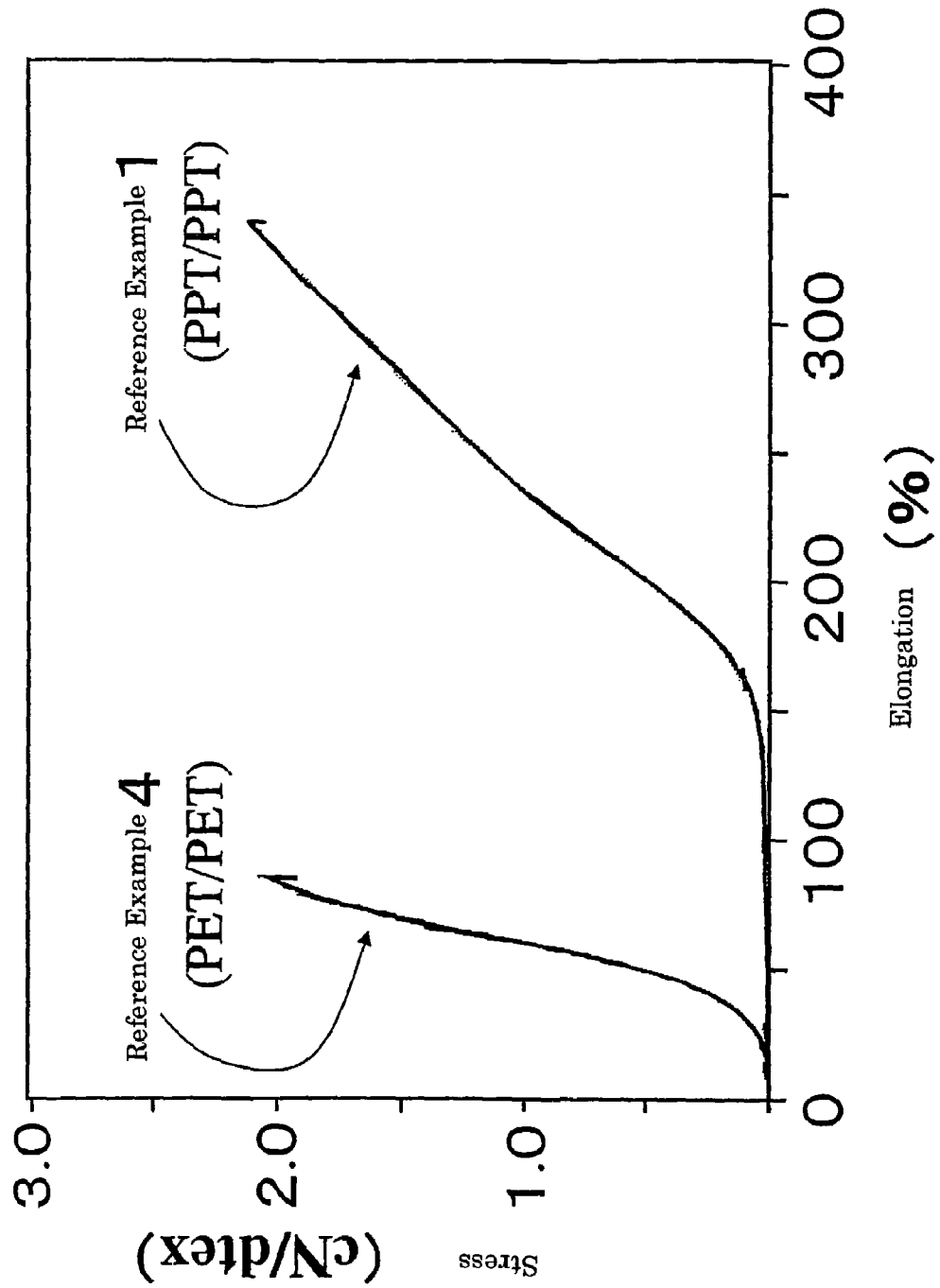
FIG. 5 shows a stress-elongation curves of the fiber that can be used for producing the leather-like sheet of the present invention and of the fiber that cannot be used for producing the leather-like sheet of the present invention, after a boiling-water treatment.

Homo-PTT of the intrinsic viscosity (IV) of 1.18 (1120 poise melting viscosity) and homo-PTT of the intrinsic viscosity of 0.65 (260 poise melting viscosity) were separately molten, extruded through a composite spinneret with twelve holes having a structure shown in FIG. 4 with a composite ratio (wt %) of 50:50 at a spinning temperature of 260° C., and taken up at a spinning speed of 1400 m/min. to obtain a side-by-side type conjugate structure undrawn yarn of 165 dtex and 12 filaments (the cross section of the fiber is as shown in FIG. 3(*a*)).

Furthermore, the yarn was drawn by using a hot roller-hot plate type drawing machine (contact yarn length: 20 cm, surface roughness: 3S) at 3.0 draw ratio, at the hot roller temperature of 70° C. and the hot plate temperature of 145° C. to obtain a drawn yarn of 55 dtex and 12 filaments (single fiber fineness: 4.6 dtex). The yarn-producing property was good for both spinning and drawing without any yarn breakage.

Table 1 shows the physical property values, indicating excellent crimpability and crimp retaining property.

Reference Example 2

There was performed evaluation in the same method as that of Reference Example 1, except that used was a combination of homo-PTT of the intrinsic viscosity (IV) of 1.50 (1340 poise melting viscosity) and homo-PET of the intrinsic viscosity of 0.52 (570 poise melting viscosity), which was spun at a spinning temperature of 275° C. and drawn at 3.15 draw ratio. The result is shown in Table 1. The yarn-producing property of Reference Example 2 was good. Furthermore, the crimpability and the crimp retaining property equivalent to those of Reference Example 1 were obtained.

Reference Example 3

There was performed evaluation in the same method as that of Example 1, except that used was the undrawn yarn obtained in Reference Example 1 and the draw ratio was 2.7. The result is shown in Table 1. The yarn-producing property was good in Reference Example 3, in which the drawn yarn of 61 dtex and 12 filaments (single fiber fineness d: 5.1 dtex) was obtained. The sample of Reference Example 3 exhibited the crimpability and crimp retaining property inferior to those of Reference Example 1, lacking in potential for being a stretch material.

Reference Example 4

There was performed evaluation in the same method as that of Reference Example 1, except that used was a combination of homo-PET of the intrinsic viscosity (IV) of 0.85 (3000 poise melting viscosity) and homo-PET of the intrinsic viscosity (IV) of 0.60, which was spun at a spinning temperature of 290° C. and drawn at the first hot roller temperature of 85° C. The result is shown in Table 1. The yarn-producing property of Reference Example 4 was good. However, both the crimpability and crimp retaining property were low, thereby lacking in potential for being a stretch material.

Reference Example 5

There was manufactured a yarn by the same method as that of Reference Example 1, except that used was a combination of homo-PTT of the intrinsic viscosity (IV) of 1.50 (1340 poise melting viscosity) containing 0.35 wt % of titanium oxide of an average grain diameter of 0.4 μm as a matting agent and homo-PET of the intrinsic viscosity (IV) of 0.52 (570 poise melting viscosity) containing 0.35 wt % of titanium oxide of an average grain diameter of 0.4 μm as a matting agent, which was spun at a spinning temperature of 275° C. using a spinneret with twenty-four slit-type discharge holes and drawn at 3.15 draw ratio. The result is shown in Table 1. Reference Example 5 had the cross sectional shape of FIG. 3(f), and the flatness degree (ratio of the major axis to minor axis) was 1.6. The yarn-producing property was good for both spinning and drawing without any yarn breakage. Table 1 shows the physical property values, indicating excellent crimpability, crimp retaining property, and bulkiness.

Reference Example 6

There was manufactured a yarn by the same method as that of Reference Example 5, except that the spinneret discharge holes were asymmetrical-slit type and a temperature of the hot plate was set at 180° C. when drawing. The result is shown in Table 1. Reference Example 6 had the cross sectional shape of FIG. 3(g), and the flatness degree (ratio of the major axis to minor axis) was 2.0. The yarn-producing property was good for both spinning and drawing without any yarn breakage. Table 1 shows the physical property values, indicating excellent crimpability, crimp retaining property, and bulkiness as phases between the single fibers are still more shifted in Reference Example 6 than in Reference Example 5.

TABLE 1

| | REF. EXAMPLE 1 | REF. EXAMPLE 2 | REF. EXAMPLE 3 | REF. EXAMPLE 4 | REF. EXAMPLE 5 | REF. EXAMPLE 6 |
|---|---|---|---|---|---|---|
| high-viscosity component | PTT | PTT | PTT | PET | PET | PET |
| low-viscosity component | PTT | PET | PTT | PET | PET | PET |
| high-viscosity component(IV) | 1.18 | 1.50 | 1.18 | 0.85 | 1.50 | 1.50 |
| low-viscosity component(IV) | 0.65 | 0.52 | 0.65 | 0.60 | 0.52 | 0.52 |
| viscosity difference ΔIV | 0.53 | 0.98 | 0.53 | 0.25 | 0.98 | 0.98 |
| high-viscosity component(η) | 1120 | 1340 | 1120 | 3000 | 1340 | 1340 |
| low-viscosity component(η) | 260 | 570 | 260 | 950 | 570 | 570 |
| shrinkage stress(cN/dtex) | 0.34 | 0.43 | 0.19 | 0.30 | 0.20 | 0.19 |
| peak temperature(° C.) | 137 | 137 | 137 | 128 | 139 | 185 |
| stretch elongation ratio(%) | 120 | 165 | 27 | 14 | 123 | 160 |
| stretch modulus of elasticity(%) | 98 | 96 | 87 | 83 | 97 | 98 |
| composite interface R(μm) | 44 | 33 | 44 | 45 | unmeasured | unmeasured |
| flatness degree | 1.0 | 1.0 | 1.0 | 1.0 | 1.5 | 2.0 |
| breaking elongation 1(%) | 29 | 32 | 40 | 30 | 30 | 28 |

TABLE 1-continued

|  | REF. EXAMPLE 1 | REF. EXAMPLE 2 | REF. EXAMPLE 3 | REF. EXAMPLE 4 | REF. EXAMPLE 5 | REF. EXAMPLE 6 |
|---|---|---|---|---|---|---|
| breaking elongation 2(%) | 312 | 340 | 110 | 84 | 335 | 330 |
| degree of crystallization(%) | 40 | unmeasured | 36 | unmeasured | unmeasured | unmeasured |
| Uster unevenness U % | 0.8 | 0.7 | 0.6 | 0.9 | 0.5 | 0.9 |

In Table 1, "high-viscosity component (IV)" refers to "intrinsic viscosity of PTT or PET as high-viscosity component", "low-viscosity component (IV)" refers to "intrinsic viscosity of fiber forming polyester as low-viscosity component", "viscosity difference ΔIV" refers to "a difference of the intrinsic viscosities between the high-viscosity component and the low-viscosity component", "high-viscosity component (η)" refers to "the melting viscosity (poise) of PTT or PET as high-viscosity component", "low-viscosity component (η)" refers to "the melting viscosity (poise) of fiber-forming polyester as low-viscosity component", "shrinkage stress" refers to "the peak value of the shrinkage stress", "the peak temperature" refers to "the temperature at which the shrinkage stress exhibits the maximum value", "composite interface R" refers to "the curvature radius R of the interface between the two kinds of polyester polymer", "breaking elongation 1" refers to "the breaking elongation of the raw yarn (drawn yarn)" and "breaking elongation 2" refers to "the breaking elongation of the crimp yarn after boiling-water treatment", respectively.

Reference Example 7

A web was formed through carding and crosslapper using an sea-island type staple fiber with single fiber fineness of 3 dtex, thirty-six islands, fiber length of 51 mm, which was made of 45 parts by weight of polystyrene as the sea component and 55 parts by weight of polyethylene terephthalate as the island component. Then, it was processed with a 1-barb type needle punching machine at a punching density of 1500 punching needles/cm² to obtain a staple fiber nonwoven fabric of the apparent density of 0.21 g/cm³. Subsequently, it was immersed in a aqueous solution heated to about 95° C. containing 12% of polyvinyl alcohol (PVA) of polymerization degree of 500 and saponification degree of 88% such that the attached amount became 25% with respect to the nonwoven fabric weight when converted to solid content; subjected to shrinking treatment for two minutes simultaneously with impregnation of PVA; and dried out at 100° C. to eliminate moisture.

The obtained sheet was processed with trichloroethylene of about 30° C. until polystyrene was completely eliminated to obtain an ultrafine fiber of the single fiber fineness of about 0.046 dtex. Then, the sheet was split into two pieces vertically in the thickness direction with a standard-type splitting machine manufactured by MUROTA SEISAKUSHO Co., LTD., to obtain a nonwoven fabric of the weight per unit area of 90 g/m².

Reference Example 8

The supply amount of fiber to the card was increased to obtain the nonwoven fabric of the weight per unit area of 140 g/m² by the same method as that of Reference Example 7.

Reference Example 9

The supply amount of fiber to the card was decreased to obtain the nonwoven fabric of the weight per unit area of 50 g/m² by the same method as that of Reference Example 7.

Reference Example 10

A polyethylene terephthalate fiber of 0.1 dtex was cut into 0.5 cm in length, and a paper-making web of 20 g/m² was obtained by a paper-making method.

Examples 1 to 3

The high-crimping polyester-based conjugate fiber yarn obtained in Reference Example 1 was used without a twist (Example 1) to weave a plain woven fabric. And also the yarn was applied with S/Z twist of the twist number T of 500 times/m (twist coefficient K: 3700, Example 2) and of the twist number T of 2000 times/m (twist coefficient K: 14800, Example 3) respectively and each of which was used to weave plain woven fabrics.

Then, the nonwoven fabric obtained in Reference Example 7 was laminated only on one surface of the plain woven fabric, and which was processed from the nonwoven fabric side with a water-jet punching machine having a nozzle head with 0.1 mm-diameter jetting holes at 0.6 mm intervals at a processing speed of 1 m/min. under the pressures of 5 MPa, 10 MPa, and 20 MPa, and then processed from the back side (woven fabric side) under the pressures of 10 MPa and 20 MPa.

This was subjected to relaxing treatment at 98° C. by a conventional method, and then compressed to a half the thickness by calendaring at 150° C., 35 kN, and a processing speed of 1 m/min. Subsequently, it was subjected to raising treatment with sandpaper and dyeing with a disperse dye using a jet dyeing machine for forty-five minutes at 120° C.

All of the obtained raised leather-like sheets had the ultrafine fibers entangled with each other, which were soft and exhibited excellent stretch in both the longitudinal and transverse directions. The Martindale abrasion test was conducted for Examples 1, 2 and 3. The abrasion loss was 4 mg and the number of pill was zero in Example 1; the abrasion loss was 3 mg and the number of pill was zero in Example 2; and the abrasion loss was 3 mg and the number of pill was zero in Example 3.

Furthermore, the nonwoven fabric had an excellent appearance quality, fine writing effect, and a smooth touch. In addition, as shown in Table 2, the stretch properties in all examples were evaluated as "o", indicating "the excellent stretch". However, the stretch varies depending on the number of twists, and those without a twist or with a small number of twists exhibited flexible stretch properties.

Example 4

The nonwoven fabric obtained in Reference Example 5 was used as the outermost layer (top surface), the plain woven fabric obtained by applying S/Z twist of the twist number T of 500 times/m to the high-crimping polyester-based conjugate fiber obtained in Reference Example 1 as the middle layer, and the nonwoven fabric obtained in Reference Example 9 as the lowest layer (back surface), which were laminated and compressed by water-jet punching treatment and calendaring treatment as in Example 2. Then, both the top and back of it were subjected to raising treatment with sandpaper and dyeing thereafter.

In the obtained leather-like sheet, the ultrafine fibers were entangled with each other. The stretch thereof was "o" as shown in Table 2, and the back-surface quality was superior to those of Examples 1 and 2. Furthermore, when the Martindale abrasion test was conducted, the abrasion loss was 6 mg and one pill was observed.

Example 5

A leather-like sheet was obtained by carrying out the same processing as that of Example 2, except that the nonwoven fabric to be laminated was changed from the one obtained in Reference Example 7 to the one obtained in Reference Example 8. In the obtained sheet, the ultrafine fibers are entangled with each other and, as shown in Table 2, the stretch was evaluated as "o", indicating "the excellent stretch". Although the hand was slightly stiffer than that of Example 1, the surface quality was better than that of Example 1. In addition, when the Martindale abrasion test was conducted, the abrasion loss was 10 mg and one pill was observed.

Example 6

A leather-like sheet was obtained by carrying out the same processing as that of Example 2, except that used was the high-crimping polyester-based conjugate fiber obtained in Reference Example 2. In the obtained sheet, the ultrafine fibers are entangled with each other and, as shown in Table 2, the stretch as in Example 2 was evaluated as "o", which indicates "the excellent stretch". The obtained sheet also had excellent surface quality. In addition, when the Martindale abrasion test was conducted, the abrasion loss was 3 mg and the number of pill was zero.

Comparative Examples 1 to 3

The same processing was carried out (in Comparative Example 1, Comparative Example 2, Comparative Example 3) as that of Example 1, Example 2, and Example 3, except that used was the high-crimping polyester-based conjugate fiber obtained in Reference Example 3.

In the obtained sheets, the ultrafine fibers were entangled with each other. The Martindale abrasion test was conducted for Comparative Examples 1, 2 and 3. The abrasion loss was 3 mg and the number of pill was zero in Comparative Example 1; the abrasion loss was 3 mg and the number of pill was zero in Comparative Example 2; and the abrasion loss was 4 mg and the number of pill was zero in Comparative Example 3.

All exhibited the excellent surface quality. However, as shown in Table 2, the stretch in Comparative Example 1 was evaluated as "Δ" indicating "the regular stretch", and the stretch in Comparative Examples 2 and 3 were evaluated as "X" indicating "the inferior stretch".

Comparative Example 4

The same processing as that of Comparative Example 2 was carried out except that used was Reference Example 4. In the obtained leather-like sheet, the ultrafine fibers were entangled with each other. When the Martindale abrasion test was conducted, the abrasion loss was 2 mg and the number of pill was zero. The surface quality was excellent, however, as shown in Table 2, the stretch was evaluated as "X" indicating "the inferior stretch".

Example 7

After the water-jet punching treatment in Example 1, the resulting product was impregnated with a dispersion liquid made of emulsion polyurethane ("EVAFANOL APC-55", a product of NICCA CHEMICAL Co., LTD.), an anti-migration agent ("NEOSTECKER", a product of NICCA CHEMICAL Co., LTD.), and water such that the solid content of emulsion polyurethane became 3% and then subjected to heat treatment. After that, it was subjected to raising treatment and dyeing as in Example 3 to obtain a raised artificial leather.

In the obtained leather, the ultrafine fibers are entangled with each other. When the Martindale abrasion test was conducted, the abrasion loss was 2 mg and the number of pill was zero. However, the hand was a little stiff and, even though the evaluation of the stretch was "o" as shown in Table 2 indicating "the excellent stretch", it was inferior to that of Example 1.

Example 8

After fabricating a plain woven fabric with the high-crimping polyester-based conjugate fiber (without a twist) obtained in Reference Example 1, it was subjected to relaxing treatment by a conventional method at 98° C. to obtain a stretching woven or knitted fabric. Then, the nonwoven fabric obtained in Reference Example 5 was laminated only on one surface of it, and which was processed from the nonwoven side with a water-jet punching machine having a nozzle head with 0.1 mm-diameter jetting holes at 0.6mm intervals at a processing speed of 1 m/min. under the pressures of 5 MPa, 10 MPa, and 20 MPa, and then processed from the back side (woven fabric side) under the pressures of 10 MPa and 20 MPa. After the processing, it was subjected to raising treatment with sandpaper and dyeing with a disperse dye using a jet dyeing machine for forty-five minutes at 120° C. . The obtained nonwoven fabric was immersed in a aqueous solution containing a softening agent (amino-modified silicone emulsion "ALDACK AN980SF", a product of IPPOSHA OIL INDUSTRIES Co., LTD.) and fine particles (colloidal silica "SNOWTEX 20L", a product of NISSAN KAGAKU KENKYUSHO Co., LTD., average grain diameter of 0.04 to 0.05 μm: BET method), which was squeezed so that colloidal silica became 0.3% and then dried at 100° C. while being brushed.

All of the obtained raised leather-like sheets had the ultrafine fibers entangled with each other, which exhibited softer hand than that of those obtained in Example 1 and exhibited an excellent stretch in both the longitudinal and transverse directions. As shown in Table 2, Example 8 was evaluated as "o" indicating "the excellent stretch".

Furthermore, when the Martindale abrasion test was conducted, the abrasion loss was 5 mg and the number of pill was zero. In addition, the nonwoven fabric surface had excellent appearance quality and writing effect and a smooth touch.

Example 9

A leather-like sheet was obtained by carrying out the same processing as that of Example 8 except that the paper-making web obtained in Reference Example 10 was laminated on a back-surface of the sheet using a water-jet punching machine.

In the obtained raised leather-like sheet, the ultrafine fibers are entangled with each other and had softer hand than those obtained in Example 1. The stretch was excellent in both the longitudinal and transverse directions, which was, as shown in Table 2, evaluated as "o", indicating "the excellent stretch". Furthermore, when the Martindale abrasion test was conducted, the abrasion loss was 7 mg and the number of pill was zero. In addition, the nonwoven fabric surface had excellent appearance quality and writing effect and a smooth touch.

Example 10

A leather-like sheet was obtained by carrying out the same processing as that of Example 9 except that used was the fiber (without a twist) obtained in Reference Example 5. All the obtained raised leather-like sheets had the ultrafine fibers entangled with each other, which had softer hand than those obtained in Example 1. The stretch was excellent in both the longitudinal and transverse directions, which was, as shown in Table 2, evaluated as "o", indicating "the excellent stretch".

Furthermore, when the Martindale abrasion test was conducted, the abrasion loss was 4 mg and the number of pill was zero. Furthermore, the nonwoven fabric surface exhibited superior smoothness than those obtained in Example 9, having fine appearance quality and excellent writing effect, and also had a smooth touch.

Example 11

A leather-like sheet was obtained by carrying out the same processing as that of Example 9 except that used was the fiber (without a twist) obtained in Reference Example 6.

All the obtained napped leather-like sheets had the ultrafine fibers entangled with each other, which were softer hand than those obtained in Example 1. The stretch was excellent in both the longitudinal and transverse directions, which was, as shown in Table 2, evaluated as "o", indicating "the excellent stretch".

Furthermore, when the Martindale abrasion test was conducted, the abrasion loss was 6 mg and the number of pill was zero. In addition, the nonwoven fabric surface exhibited superior smoothness than those obtained in Example 9, having fine appearance quality and excellent writing effect, and also had a smooth touch.

TABLE 2

|  | elongation ratio (%) | | elongation recovery ratio (%) | | eval-uation |
| --- | --- | --- | --- | --- | --- |
|  | longi-tudinal | trans-verse | longi-tudinal | trans-verse |  |
| EXAMPLE 1 | 18 | 26 | 92 | 87 | ○ |
| EXAMPLE 2 | 15 | 25 | 91 | 86 | ○ |
| EXAMPLE 3 | 8 | 12 | 92 | 88 | ○ |
| EXAMPLE 4 | 13 | 20 | 92 | 90 | ○ |
| EXAMPLE 5 | 16 | 25 | 93 | 90 | ○ |
| EXAMPLE 6 | 18 | 27 | 91 | 85 | ○ |
| COMPARATIVE EXAMPLE 1 | 5 | 7 | 92 | 90 | Δ |
| COMPARATIVE EXAMPLE 2 | 3 | 4 | 93 | 91 | X |
| COMPARATIVE EXAMPLE 3 | 2 | 4 | 93 | 92 | X |
| COMPARATIVE EXAMPLE 4 | 3 | 3 | 91 | 90 | X |
| EXAMPLE 7 | 14 | 23 | 95 | 92 | ○ |
| EXAMPLE 8 | 20 | 29 | 94 | 89 | ○ |
| EXAMPLE 9 | 18 | 25 | 95 | 90 | ○ |
| EXAMPLE 10 | 17 | 24 | 93 | 90 | ○ |
| EXAMPLE 11 | 18 | 25 | 93 | 91 | ○ |

INDUSTRIAL APPLICABILITY

The present invention relates to a leather-like sheet excellent in the stretch, which provides excellent wearing feeling and formability. The present invention can be utilized in the industry of manufacturing artificial leather.

Particularly, the leather-like sheet of the present invention can be used to manufacture clothing with an excellent stretch and a fine wearing feeling by utilizing its characteristic. For example, it can provide very comfortable clothing as outer garments such as slacks and jackets. Therefore, it can be utilized in the apparel industry, the textile industry, or the like.

Furthermore, because of its fine stretch, it can be suitable for outer fabric of a chair, sofa, car sheet or the like. When employing a method of three-dimensional shaping for forming such three-dimensional form with a two-dimensional sheet, a desired shaping cannot be achieved unless the fabric can be stretched to some extent. The leather-like sheet according to the present invention can well tolerate the three-dimensional shaping. Therefore, it can be utilized in the industries where such three-dimensional shaping is required, such as the furniture industry.

What is claimed is:

1. A leather-like sheet comprising the integration of entanglement of a woven or knitted fabric and an ultrafine fiber of 0.0001 to 0.5 dtex, wherein
   at least one face of the leather-like sheet is substantially composed of said ultrafine fibers, and said woven or knitted fabric comprises a conjugate fiber in which a high-shrinkage component and a low-shrinkage component with a conjugate ratio of both components being within 75:25 to 35:65 wt % comprised of polyester-based polymers, at least one of which consists essentially of polytrimethylene terephthalate, are stuck to form along the fiber length direction a side-by-side or an eccentric sheath-core type structure, and the conjugate fiber constituting the woven or knitted fabric has a twist coefficient defined by the expression below of 20000 or below twist coefficient $K = T \times D^{0.5}$ where, T: number of twists per one meter of fiber yarn (times)
D: fineness of fiber yarn (dtex).

2. The leather-like sheet according to claim 1, which includes a polymeric elastomer by less than 5 wt%.

3. The leather-like sheet according to claim 1, which is composed substantially of a fiber material and contains substantially no polymeric elastomer.

4. The leather-like sheet according to claim 1, which is composed of the ultrafine fibers entangled with each other, and also includes ultrafine staple fibers of a fiber length of 10 to 100 mm.

5. The leather-like sheet according to claim 1, wherein an abrasion loss is 20 mg or less in an abrasion test by Martindale method when the surface thereof is worn 20000 times, and number of pills is five or less.

6. The leather-like sheet according to claim 1, wherein both of the two kinds of polyester-based polymers are polyesters consisting essentially of polytrimethylene terephthalate.

7. The leather-like sheet according to claim 1, wherein one of the two kinds of polyester-based polymers is polyester consisting essentially of polyethylene terephthalate, and the other is polyester consisting essentially of polytrimethylene terephthalate.

8. The leather-like sheet according to claim 1, wherein the conjugate fiber made of the two kinds of polyester-based polymers has curvature radius R of a composite interface in a fiber cross section within a range of following expression, curvature radius $R$ (μm)$\geq 10\ d^{0.5}$ where, d: single fiber fineness (dtex).

9. The leather-like sheet according to claim 1, wherein the conjugate fiber made of the two kinds of polyester-based polymers has a fiber cross section in a flat shape having a composite interface in a minor-axis direction, and a flatness degree expressed by a ratio of major axis to minor axis of the cross section is within a range of 1.3 to 6.

10. The leather-like sheet according to claim 1, wherein the conjugate fiber consisting of the two kinds of polyester-based polymers has crimps caused by false-twisting.

11. The leather-like sheet according to claim 1, wherein the number of twists T of a fiber yarn constituting the woven or knitted fabric is 0 to 3000 times/m.

12. The leather-like sheet according to claim 1, wherein the ultrafine fiber is polyester ultrafine fiber.

13. The leather-like sheet according to claim 1, of which at least one of surfaces is napped.

14. The leather-like sheet according to claim 1, wherein an elongation ratio in at least one direction is 10 to 50%, and an elongation recovery ratio thereof is 75 to 100%.

15. The leather-like sheet according to claim 1, wherein the elongation ratio in a longitudinal direction is 5 to 30%, the elongation ratio in a transverse direction is 10 to 50%, and the elongation ratio in the transverse longitudinal direction is larger than that in the longitudinal direction.

16. The leather-like sheet according to claim 15, wherein the elongation recovery ratio in the longitudinal and transverse directions are 75 to 100%.

17. The leather-like sheet according to claim 1, which includes fine particles.

18. The leather-like sheet according to claim 17, wherein a diameter of the fine particle is 0.001 to 30 μm.

19. A method for producing a leather-like sheet, comprising the steps of;

integrating by entanglement of ultrafine fibers of 0.0001 to 0.5 dtex and a woven or knitted fabric which consists of a conjugate fiber in which a high-shrinkage component and a low-shrinkage component with a conjugate ratio of both components being within 75:25 to 35:65 wt % comprised of polyester-based polymers, at least one of which consists essentially of polytrimethylene terephthalate, are stuck to form along the fiber length direction a side-by-side or an eccentric sheath-core type structure, and the conjugate fiber constituting the woven or knitted fabric has a twist coefficient defined by the expression below of 20000 or below twist coefficient $K=T\times D^{0.5}$ where, T: number of twists per one meter of fiber yarn (times)

D: fineness of fiber yarn (dtex), and applying a shrinking treatment thereafter.

20. A method for producing a leather-like sheet, comprising the steps of;

applying a shrinking treatment on a woven or knitted fabric which consists of a conjugate fiber in which a high-shrinkage component and a low-shrinkage component with a conjugate ratio of both components being within 75:25 to 35:65 wt % comprised of polyester-based polymers, at least one of which consists essentially of polytrimethylene terephthalate, are stuck to form alone the fiber length direction a side-by-side or an eccentric sheath-core type structure, and the conjugate fiber constituting the woven or knitted fabric has a twist coefficient defined by the expression below of 20000 or below twist coefficient $K=T\times D^{0.5}$ where, T: number of twists per one meter of fiber yarn (times)

D: fineness of fiber yarn (dtex), and integrating by entanglement of a nonwoven fabric consisting of ultrafine fibers of 0.0001 to 0.5 dtex and the woven or knitted fabric.

21. The method for producing a leather-like sheet according to claim 19 or 20, wherein for the conjugate fiber, a temperature on a maximum shrinkage stress is 110 to 200° C., a maximum value of the shrinkage stress is 0.15 to 0.50 cN/dtex, and an stretch elongation ratio after the shrinking treatment is 30 to 250%.

22. The method for producing a leather-like sheet according to claims 19 or 20, wherein integration by entanglement is carried out by water-jet punching treatment using high-speed fluid when integrating by entanglement of the ultrafine fibers and the woven or knitted fabric.

23. The method for producing a leather-like sheet according to claims 19 or 20, when integrating by entanglement of the ultrafine fibers and the woven or knitted fabric, comprising the steps of;

producing a nonwoven fabric consisting of ultrafine fibers of 0.0001 to 0.5 dtex with a weight per unit area of 10 to 350 g/m² by needle punching treatment, laminating the woven or knitted fabric on the nonwoven fabric, and integrating by entanglement through a high-speed fluid punching treatment using the high-speed fluid.

24. The method for producing a leather-like sheet according to claims 19 or 20, when integrating by entanglement of the ultrafine fibers and the woven or knitted fabric, comprising the steps of;

entangling composite fiber convertible into a bundle of fine fibers which can generate ultrafine fibers of 0.0001 to 0.5 dtex through the needle punching treatment to produce a nonwoven fabric, generating the ultrafine fibers for obtaining a nonwoven fabric of the ultrafine fibers with a weight per unit area of 10 to 350 g/m$^2$, laminating the woven or knitted fabric on the nonwoven fabric, and integrating by entanglement through high-speed fluid punching treatment under a pressure of 10 MPa or more.

25. The method for producing a leather-like sheet according to claim 22, comprising the step in which high-speed fluid treatment is carried out using a fluid-jet nozzle having a fluid-jet hole of a diameter of 0.06 to 0.15 mm.

26. The method for producing a leather-like sheet according to claim 24, wherein composite fiber convertible into a bundle of fine fibers are sea-island type conjugate fibers.

27. The method for producing a leather-like sheet according to claims 19 or 20, comprising the step of applying the shrinking treatment of shrinking to shrinking ratio of 5 to 50% in length in at least one direction.

* * * * *